US010555057B2

(12) United States Patent
Koezuka et al.

(10) Patent No.: US 10,555,057 B2
(45) Date of Patent: Feb. 4, 2020

(54) WIRELESS SENSOR SYSTEM, COMMUNICATION DEVICE, SENSOR TAG, AND COMMUNICATION METHOD

(71) Applicant: OMRON Corporation, Kyoto (JP)

(72) Inventors: Yahiro Koezuka, Kusatsu (JP); Tetsuya Nosaka, Ibaraki (JP); Satoshi Yase, Nara (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/839,867

(22) Filed: Dec. 13, 2017

(65) Prior Publication Data

US 2018/0255373 A1 Sep. 6, 2018

(30) Foreign Application Priority Data

Mar. 3, 2017 (JP) ................. 2017-040076

(51) Int. Cl.
*H04Q 9/00* (2006.01)
*G06K 7/10* (2006.01)

(52) U.S. Cl.
CPC ........... *H04Q 9/00* (2013.01); *G06K 7/10435* (2013.01); *H04Q 2209/47* (2013.01); *H04Q 2209/845* (2013.01)

(58) Field of Classification Search
CPC ................ H04Q 9/00; H04Q 2209/47; H04Q 2209/845; G06K 7/10435
See application file for complete search history.

(56) References Cited

U.S. PATENT DOCUMENTS

2006/0244568 A1* 11/2006 Tong ...................... G01D 21/00
340/10.41
2010/0237995 A1* 9/2010 Iwahashi ................ G06K 17/00
340/10.1

FOREIGN PATENT DOCUMENTS

JP 2016165082 9/2016

* cited by examiner

*Primary Examiner* — Amine Benlagsir
(74) *Attorney, Agent, or Firm* — JCIPRNET

(57) ABSTRACT

A wireless sensor system includes a sensor tag configured to include a radio frequency tag and a communication device configured to wirelessly communicate with one or more sensor tags. Each of the sensor tags is configured to receive a measurement signal from one or more sensor circuits and stores identification information capable of being distinguished from other sensor tags. The communication device includes a transmission means configured to transmit a command signal to the one or more sensor tags and the command signal includes designation information for designating a sensor target serving as an object. Each of the sensor tags generates measurement data on the basis of the measurement signal if the designation information included in the command signal received from the communication device matches its own stored identification information and starts transmission of a response signal including the generated measurement data when a predetermined response start condition is satisfied.

7 Claims, 16 Drawing Sheets

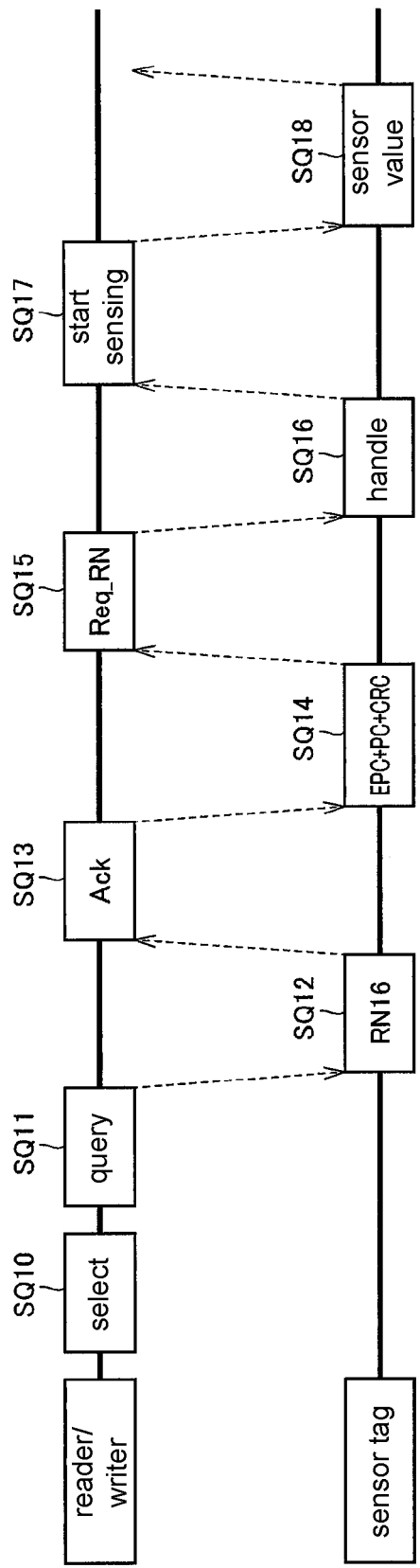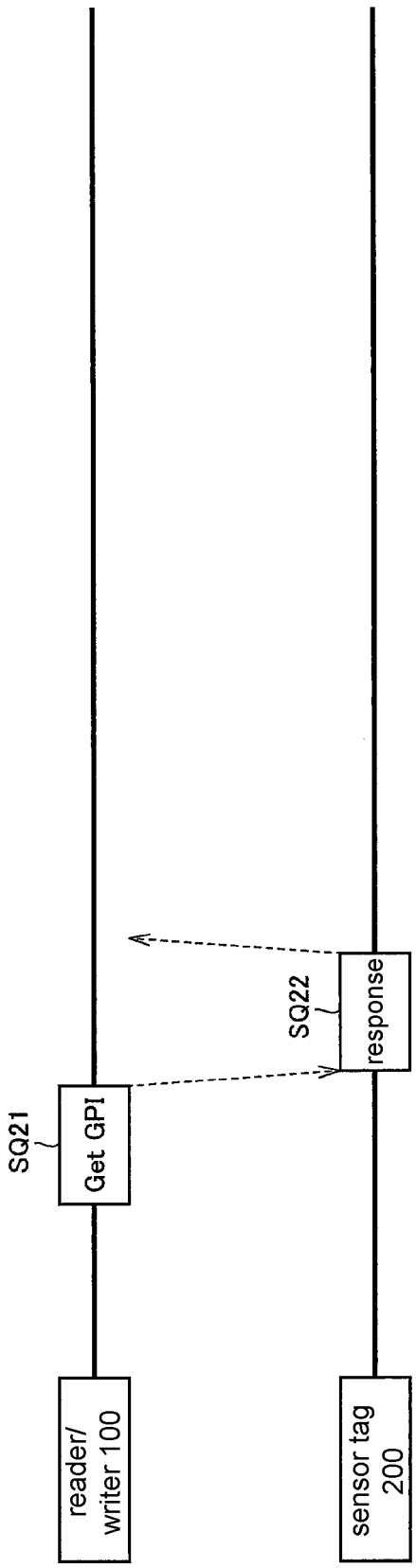

| SOF preamble | custom 8bit | command 8bit | DR 1bit | M 2bit | Trext 1bit | selected Gr 10bit | selected ID 6bit | CRC 16bit |
|---|---|---|---|---|---|---|---|---|
| 302 | | 304 | | | | 306 | 308 | 310 |

| SOF preamble | GPI value 1bit | CRC 16bit |
|---|---|---|

WIRELESS SENSOR SYSTEM, COMMUNICATION DEVICE, SENSOR TAG, AND COMMUNICATION METHOD

CROSS-REFERENCE TO RELATED APPLICATION

This application claims the priority benefit of Japan application serial no. 2017-040076, filed on Mar. 3, 2017. The entirety of the above-mentioned patent application is hereby incorporated by reference herein and made a part of this specification.

BACKGROUND

Technical Field

The present disclosure relates to a wireless sensor system configured to transmit measurement data via wireless communication, a communication device and a sensor tag used in the system, and a communication method for use in the system.

Description of Related Art

In the field of factory automation (FA), various types of control are implemented by measuring a state of a machine, a facility, or the like to be controlled with a sensor and collecting the measured data with a control device or the like. In order to implement more detailed control, it is important to arrange more sensors and collect more measurement data.

On the other hand, when more sensors are arranged, an amount of wiring for collecting measurement data from the sensors also increases.

To solve such a problem, for example, Japanese Unexamined Patent Application Publication No. 2016-165082 (Patent Document 1) discloses a wireless device capable of collecting measurement data with a sensor via wireless communication within a predetermined closed space. Sensors capable of transmitting measurement data via such wireless communication may be collectively referred to as a "wireless sensor" and all systems including such sensors may be collectively referred to as a "wireless sensor system."

[Patent Document 1] Japanese Unexamined Patent Application Publication No. 2016-165082

If a configuration in which a plurality of wireless sensors as described above are arranged and measurement data from the wireless sensors is collected by a common device is adopted, it is necessary for the common device to perform communication establishment and state monitoring with each wireless sensor. Japanese Unexamined Patent Application Publication No. 2016-165082 (Patent Document 1) mainly provides a means for solving the problem that standing waves due to radio waves are generated within a closed space, and no means for solving the problems described above is provided.

A configuration in which an easy arrangement of a plurality of sensors and efficient collection of measurement data from each sensor can be implemented is desired.

SUMMARY

According to an aspect of the present disclosure, a wireless sensor system includes a sensor tag configured to include a radio frequency (RF) tag; and a communication device configured to wirelessly communicate with one or more sensor tags. Each of the one or more sensor tags is configured to receive a measurement signal from one or more sensor circuits and stores identification information capable of being distinguished from that of other sensor tags. Each of the one or more sensor tags may be configured to externally output a signal. The communication device includes a transmission means configured to transmit a command signal to the one or more sensor tags and the command signal includes designation information for designating a sensor tag serving as an object. Each of the one or more sensor tags generates measurement data on the basis of the measurement signal if the designation information included in the command signal received from the communication device matches its own stored identification information. Each of the one or more sensor tags starts transmission of a response signal including the generated measurement data when a predetermined response start condition is satisfied.

BRIEF DESCRIPTION OF THE DRAWINGS

FIG. 7A and FIG. 7B are time charts illustrating a sequence in the wireless sensor system according to the present embodiment.

FIG. 9A and FIG. 9B are diagrams illustrating examples of data structures of a command signal and a response signal exchanged in the wireless sensor system according to the present embodiment.

DESCRIPTION OF THE EMBODIMENTS

Figure 1:
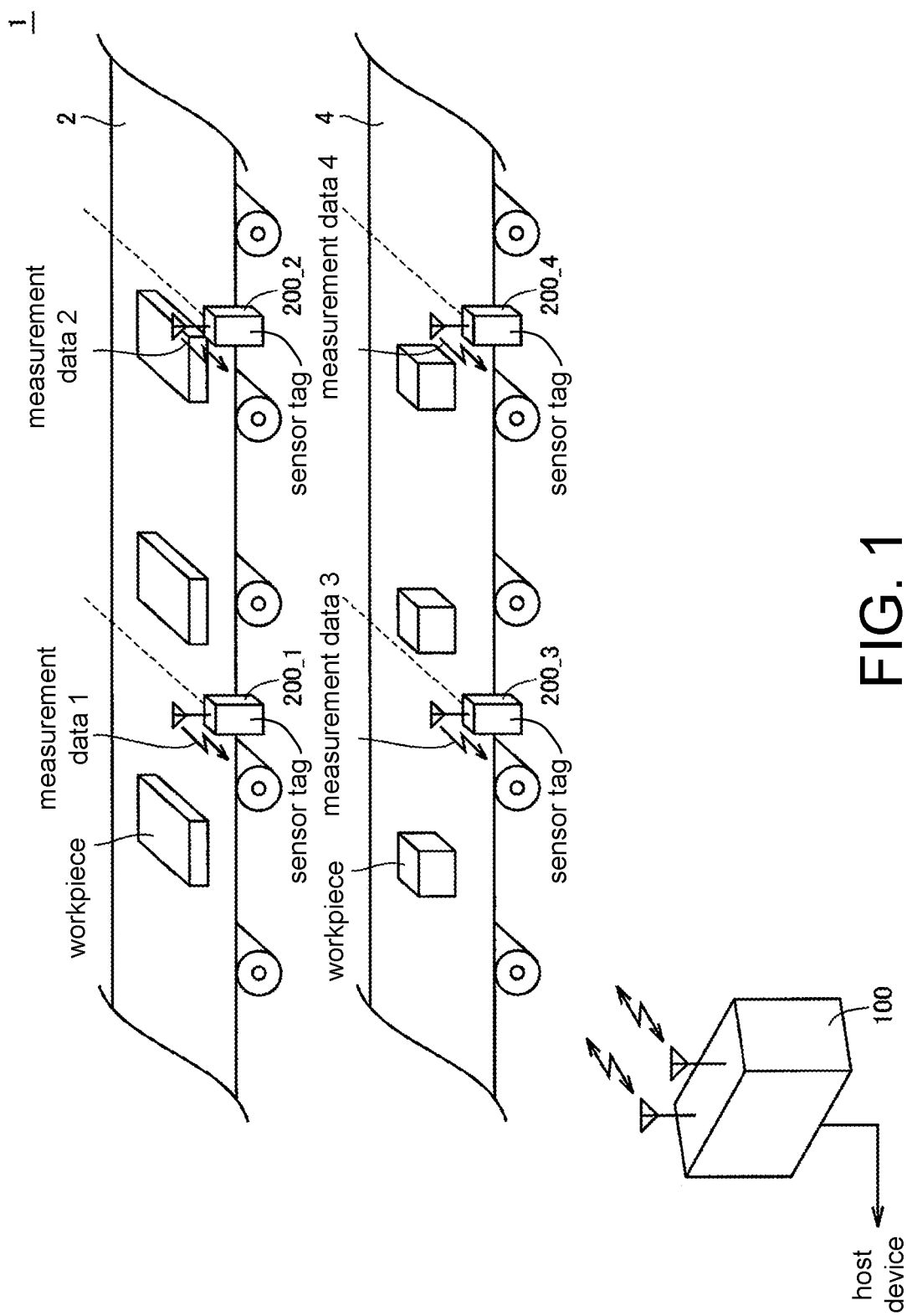
FIG. 1 is a schematic diagram illustrating a configuration example of a wireless sensor system according to this embodiment.

Embodiments of the present disclosure will be described in detail with reference to the drawings. Also, the same or corresponding parts are denoted by the same reference signs and description thereof will not be repeated.

A wireless sensor system configured to transmit measurement data via wireless communication, a communication device and a sensor tag used in the system, and a communication method for use in the system are provided.

Preferably, the identification information includes first identification information indicating a group to which each sensor tag belongs and second identification information for specifying each sensor tag.

Preferably, the designation information includes first designation information for designating a group serving as an object and second designation information for individually designating a sensor tag serving as an object. Each of the one or more sensor tags executes the generation of the measurement data and the transmission of the response signal if its own stored first identification information matches the first designation information included in the designation information and its own stored second identification information matches the second designation information included in the designation information.

Preferably, the designation information includes information for designating a group serving as an object. Each of the one or more sensor tags executes the generation of the measurement data and the transmission of the response signal if its own stored first identification information matches a group designated in the designation information.

Preferably, each of the one or more sensor tags starts the transmission of the response signal without causing a response delay when the generation of the measurement data is completed if its own stored second identification information is a value indicating a head of a response.

Preferably, each of the one or more sensor tags starts the transmission of the response signal after waiting until the number of times that an additional command signal is transmitted from the communication device and a value indicated by its own stored second identification information satisfy a predetermined relationship if its own stored second identification information is not a value indicating a head of a response.

Preferably, each of the one or more sensor tags starts the transmission of the response signal after waiting for a time determined on the basis of a value indicated by its own stored second identification information.

Preferably, the response signal includes information of a plurality of measurement signals collected at different timings.

According to another aspect of the present disclosure, a communication device for wirelessly communicating with one or more sensor tags, each of which includes a radio frequency (RF) tag, is provided. Each of the one or more sensor tags is configured to receive a measurement signal from one or more sensor circuits and stores identification information capable of being distinguished from that of other sensor tags. Each of the one or more sensor tags may be configured to externally transmit a signal. The communication device includes a transmission means configured to transmit a command signal to the one or more sensor tags. The command signal includes designation information for designating a sensor tag serving as an object. The communication device includes a reception means configured to receive a response signal from the one or more sensor tags. The response signal includes measurement data based on the measurement signal generated when designation information included in the command signal matches identification information stored in the sensor tag. The response signal is transmitted at a timing at which a response start condition set in each of the sensor tags is satisfied.

According to still another aspect of the present disclosure, a sensor tag including a radio frequency (RF) tag is provided. The sensor tag is configured to receive a measurement signal from one or more sensor circuits and stores identification information capable of being distinguished from that of other sensor tags. The sensor tag may be configured to externally transmit a signal. The sensor tag generates measurement data on the basis of the measurement signal if designation information for designating a sensor tag serving as an object included in a command signal matches stored identification information when the command signal is received from a communication device configured to wirelessly communicate with the sensor tag. The sensor tag starts transmission of a response signal including the generated measurement data when a predetermined response start condition is satisfied.

According to still another aspect of the present disclosure, a communication method for use in a wireless sensor system including a sensor tag configured to include a radio frequency (RF) tag and a communication device configured to wirelessly communicate with one or more sensor tags is provided. Each of the one or more sensor tags is configured to receive a measurement signal from one or more sensor circuits and stores identification information capable of being distinguished from that of other sensor tags. Each of the one or more sensor tags may be configured to externally transmit a signal. The communication method includes the step of transmitting, by the communication device, a command signal to the one or more sensor tags. The command signal includes designation information for designating a sensor target serving as an object. The communication method includes the steps of generating, by each of the one or more sensor tags, measurement data on the basis of the measurement signal if the designation information included in the command signal received from the communication device matches its own stored identification information; and starting, by each of the one or more sensor tags, transmission of a response signal including the generated measurement data when a predetermined response start condition is satisfied.

According to the present disclosure, an easy arrangement of a plurality of sensors and efficient collection of measured data from each sensor can be implemented.

A. Outline of Wireless Sensor System

First, an outline of a wireless sensor system according to the present embodiment will be described. In the present specification, the term "wireless sensor system" refers to a system including at least one sensor capable of transmitting measurement data via wireless communication and is not intended to exclude a sensor configured to transmit the measurement data via any wiring (wired signal). Also, because any frequency, any modulation scheme, and any transmission protocol can be adopted in wireless communication, the present disclosure is not intended to be limited to a specific configuration. For convenience of description, the wireless sensor system may be simply referred to as a "system" below.

FIG. 1 is a schematic diagram illustrating a configuration example of a wireless sensor system 1 according to the present embodiment. FIG. 1 illustrates an example of the system 1 configured to collect measurement data from a production line including conveyors 2 and 4 as an example.

In the present embodiment, the system 1 adopting short-range wireless communication as a wireless communication means is exemplified. More specifically, although a configuration adopting passive radio frequency identification (RFID) is exemplified as a typical example of the short-distance wireless communication, the present disclosure is not limited thereto. For example, improved and novel schemes based on RFID technology in the future can also be included in the technical scope of the present disclosure.

Referring to FIG. 1, the system 1 includes a communication device as a master device responsible for collecting measurement data and managing each sensor. Because the communication device is often referred to as a "reader/writer" focusing on its function in the general RFID field, the communication device will also be referred to as "reader/writer 100" in the following description. However, it is not indispensable for the communication device to have both a function of reading data from the radio frequency (RF) tag (a reader function) and a function of writing the data to the RF tag (a writer function), and only one function may be provided.

The system 1 further includes a slave device having an RF tag for exchanging radio signals with the communication device (the reader/writer 100). Because each slave device has one or more sensors available from the RF tag, these slave devices will be referred to as "sensor tags" in the following description. That is, the system 1 illustrated in FIG. 1 may include a plurality of sensor tags 200_1 to 200_4 (which may be collectively referred to as a "sensor tag 200" hereinafter).

That is, each of the sensor tags 200 includes an RF tag and the communication device (the reader/writer 100) wirelessly communicates with one or more of the sensor tags 200. Also, the RF tag may be referred to as an integrated circuit (IC) tag or an RFID tag, but, for convenience of description, it is referred to as an "RF tag" hereinafter.

The sensor tag 200 is intended to have a configuration in which the function of the RF tag and the function of the sensor are combined. As will be described below, the function of the RF tag and the function of the sensor may be integrally implemented, or the functions may be implemented separately.

In the system 1 illustrated in FIG. 1, an example in which the sensor tag 200 is applied to a photoelectric sensor is shown. That is, the sensor tags 200_1 and 200_2 are incorporated as a part of the photoelectric sensor arranged along the conveyor 2 and the sensor tags 200_3 and 200_4 are incorporated as a part of the photoelectric sensor arranged along the conveyor 4.

The sensor tags 200_1 to 200_4 detect the presence of a workpiece W, and transmit measurement data 1 to 4 including detection results to the reader/writer 100. However, because a passive (or semi-passive) RFID is adopted in the system 1 according to the present embodiment, an inquiry signal is transmitted from the reader/writer 100 to the sensor tags 200_1 to 200_4 and the sensor tags 200_1 to 200_4 provide measurement data including measured values at that time as responses by receiving the inquiry signal.

Each piece of measurement data collected in the reader/writer 100 may be further transmitted to a host device such as a programmable controller (PLC) or a personal computer.

B. Hardware Configuration of Reader/Writer (Communication Device)

Next, an example of a hardware configuration of the reader/writer 100 constituting the system 1 according to the present embodiment will be described.

Figure 2:
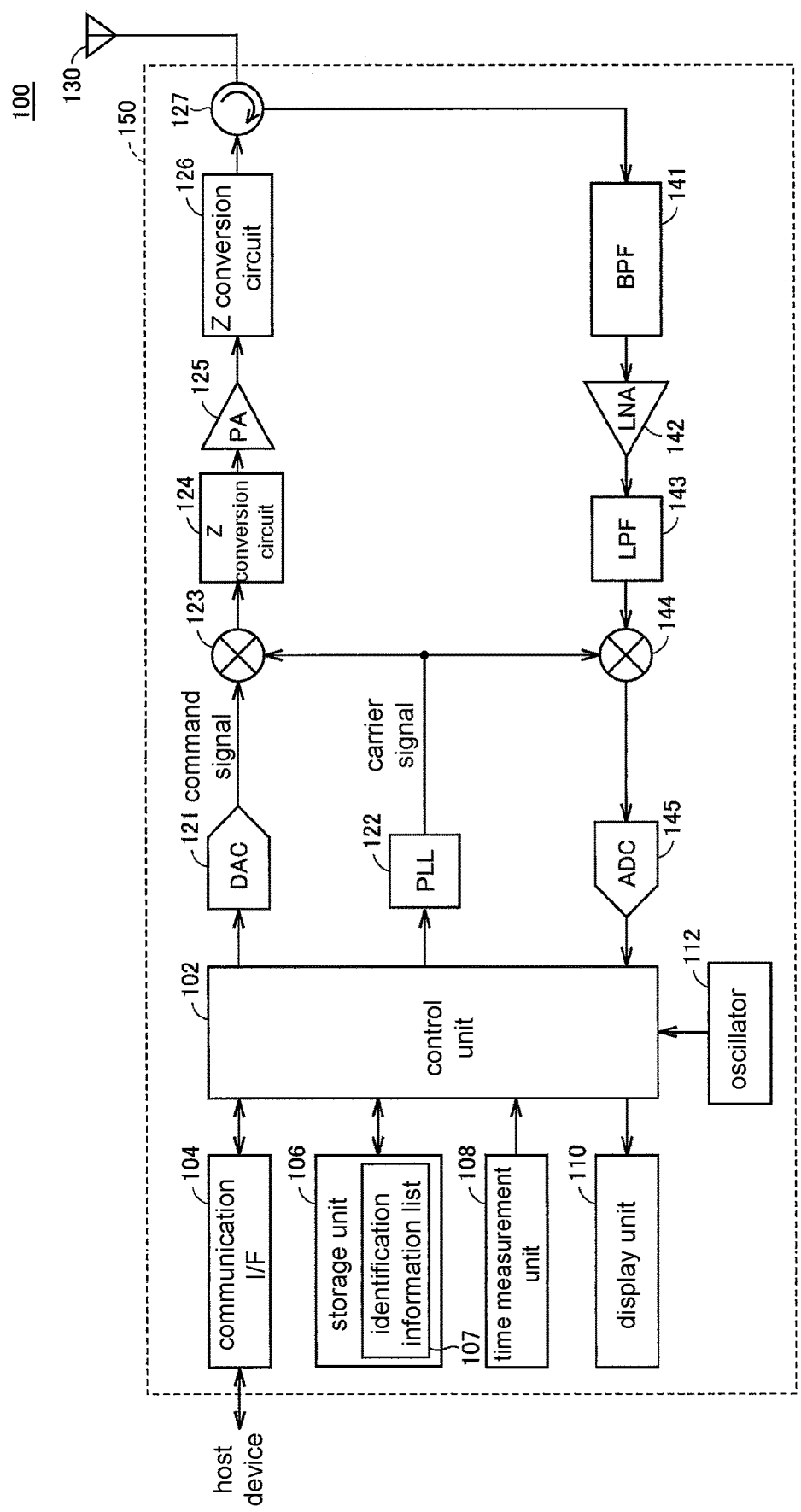
FIG. 2 is a schematic diagram illustrating an example of a hardware configuration of a reader/writer constituting the wireless sensor system according to the present embodiment.

FIG. 2 is a schematic diagram illustrating the example of the hardware configuration of the reader/writer 100 constituting the wireless sensor system 1 according to the present embodiment. Referring to FIG. 2, the reader/writer 100 includes a communication control unit 150 including a control unit 102 and an antenna 130. Although a configuration example in which the antenna 130 is separated from the communication control unit 150 is illustrated in FIG. 2, they may be integrated.

The communication control unit 150 includes an interface (I/F) 104, a storage unit 106, a time measurement unit 108, a display unit 110, and an oscillator 112 in addition to the control unit 102.

The control unit 102 is an arithmetic processing unit configured to control various types of processes in the reader/writer 100, and is typically implemented by a processor such as a central processing unit (CPU) executing a program. Alternatively, all or a part of the control unit 102 may be implemented using hardware such as an application specific integrated circuit (ASIC) or a field-programmable gate array (FPGA).

The communication interface 104 corresponds to a communication unit for exchanging data with a host device. It is only necessary for the RFID system 1 to at least be able to respond to the host device with data from the reader/writer 100. As the communication interface 104, any communication means such as Ethernet (registered trademark), serial communication, Universal Serial Bus (USB) communication, parallel communication, or various types of fieldbuses can be adopted.

The storage unit 106 stores various types of programs to be executed by the control unit 102, measurement data collected from the sensor tag 200, and the like. In the wireless sensor system 1 according to the present embodiment, because identification information is preset for the sensor tag 200 which performs an exchange with the reader/writer 100, an identification information list 107 for specifying such identification information is stored in the storage unit 106. Various types of command signals to be described below are generated with reference to the identification information list 107.

The time measurement unit 108 is a clock or a timer, and provides a timing signal to the control unit 102. The display unit 110 displays various types of information in accordance with an instruction from the control unit 102.

The oscillator 112 generates a synchronization signal for operating the control unit 102.

The communication control unit 150 corresponds to a communication unit configured to wirelessly communicate with the sensor tag 200. The communication control unit 150 generates electromagnetic waves to read the measurement data from the sensor tag 200, decodes a response signal from the sensor tag 200, and outputs a decoding result thereof.

Electromagnetic waves having a frequency of an ultra-high frequency (UHF) band can be used as the electromagnetic waves, but other frequency bands may be used.

More specifically, the communication control unit 150 includes a digital to analog converter (DAC) 121, a phase locked loop (PLL) 122, mixers 123 and 144, a pair of Z conversion circuits 124 and 126 between which a power amplifier (PA) 125 is sandwiched, a separation circuit 127, a band pass filter (BPF) 141, a low noise amplifier (LNA) 142, a low pass filter (LPF) 143, and an analog to digital converter (ADC) 145 as main components.

Hereinafter, the operation of each part for implementing a communication process between the reader/writer 100 and the sensor tag 200 will be described.

First, in response to an activation command from the control unit 102, the PLL 122 outputs a high frequency pulse (hereinafter also referred to as a "carrier signal") serving as a source of carrier waves. The carrier signal from the PLL 122 is used for modulation and demodulation. That is, the carrier signal from the PLL 122 is given to the mixer 123 and the mixer 144.

When a predetermined condition is satisfied, the control unit 102 outputs a command signal having a predetermined number of bits. The command signal is an instruction for the sensor tag 200, and is superimposed on the carrier signal and supplied to the sensor tag 200. The command signal from the control unit 102 is converted into an analog signal by the DAC 121 and then frequency-converted (up-converted) into a frequency band of a radio signal according to the carrier signal from the PLL 122 in the mixer 123.

The command signal frequency-converted by the mixer 123 is supplied to the antenna 130 via the separation circuit 127 after an impedance matching process by the Z conversion circuits 124 and 126 and an amplification process by the PA 125, so that the command signal is transmitted as electromagnetic waves for the sensor tag 200. In this manner, the sensor tag 200 has a transmission function of transmitting a command signal to one or more sensor tags 200.

In the sensor tag 200 in a range in which electromagnetic waves transmitted from the reader/writer 100 can be received, an induced electromotive force is generated internally by the received electromagnetic waves, and various types of internal circuits (details thereof will be described below) are activated by the induced electromotive force. In this state, when the command signal superimposed on the carrier waves is received, the control unit of the sensor tag 200 decodes the received command signal, executes a process according to details of the command acquired by decoding, generates a response signal including a processing result thereof, and finally responds to the reader/writer 100.

The response signal from the sensor tag 200 is received by the antenna 130 and input to the BPF 141 by the separation circuit 127. The received response signal is amplified by the LNA 142 after noise included in the received response signal is removed by the BPF 141. Further, the response signal amplified by the LNA 142 is input to the mixer 144 after a high-frequency component is removed by the LPF 143. In the mixer 144, the response signal is frequency-converted (down-converted) into a frequency band of a baseband signal according to the carrier signal from the PLL 122. Further, the response signal after the frequency conversion is converted into a digital signal by the ADC 145, and then input to the control unit 102. That is, a communication result including measurement data obtained by decoding a response signal from the sensor tag 200 is input to the control unit 102. Further, the control unit 102 may output the communication result including the measurement data obtained by the decoding to the communication interface 104.

The communication interface 104 responds to the host device 30 with the communication result from the control unit 102.

C. Hardware Configuration of Sensor Tag

Next, an example of the hardware configuration of the sensor tag 200 constituting the system 1 according to the present embodiment will be described.

Figure 3:
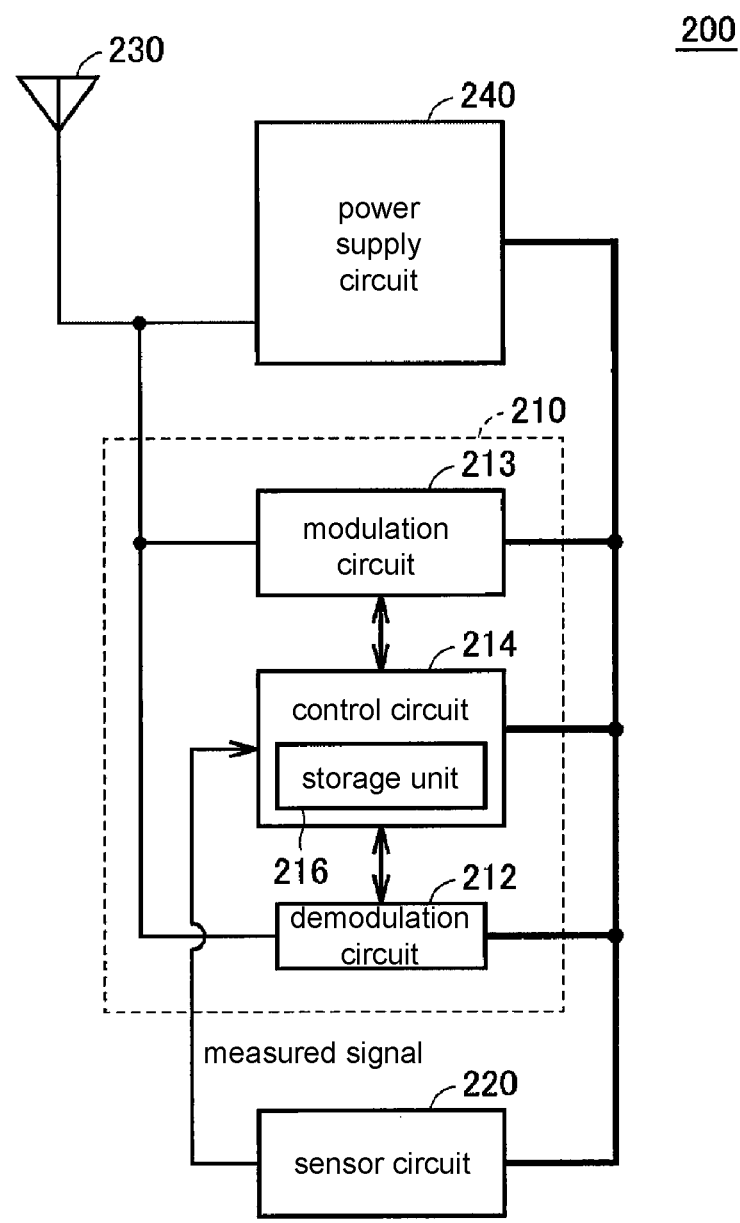
FIG. 3 is a schematic diagram illustrating an example of a hardware configuration of a sensor tag constituting a wireless sensor system according to the present embodiment.

FIG. 3 is a schematic diagram illustrating an example of the hardware configuration of the sensor tag 200 constituting the wireless sensor system 1 according to the present embodiment. Referring to FIG. 3, the sensor tag 200 includes a processing circuit 210, a sensor circuit 220, an antenna 230, and a power supply circuit 240.

The processing circuit 210 receives electric power supplied from the power supply circuit 240 and executes a process in accordance with a command signal from the reader/writer 100. As a typical process, the processing circuit 210 generates measurement data on the basis of a measurement signal from the sensor circuit 220 and responds to the reader/writer 100 with the generated measurement data. That is, each of the sensor tags 200 is configured to receive a measurement signal from one or more sensor circuits 220. Also, each of one or more sensor tags may be configured to externally output a signal. More specifically, the processing circuit 210 includes a demodulation circuit 212, a control circuit 214 including a storage unit 216, and a modulation circuit 213. These circuits are activated by receiving power from the power supply circuit 240.

The demodulation circuit 212 demodulates electromagnetic waves from the reader/writer 100 received by the antenna 230, and extracts a command signal contained therein. The control circuit 214 executes a designated process in accordance with the command signal from the demodulation circuit 212. The storage unit 216 stores parameters and the like necessary for the control circuit 214 to execute the process in accordance with the command signal. The control circuit 214 outputs a response signal including measurement data and the like to the modulation circuit 213. The modulation circuit 213 modulates a response signal from the control circuit 214 and transmits the modulated signal from the antenna 230.

The sensor circuit 220 includes any sensing device, receives electric power supplied from the power supply circuit 240, and outputs a measurement signal measured by the sensing device to the processing circuit 210. Also, the sensor circuit 220 may be configured to receive electric power supplied from a power supply other than the power supply circuit 240 (for example, a battery). Such a sensor tag corresponds to a semi-passive type and may be referred to as a "battery-assisted tag (a semi-passive tag)." That is, in the semi-passive type, electric power related to wireless communication is acquired being fed from the reader/writer 100, and driving electric power of an internal sensor, a processor, or the like is acquired from an external power supply (for example, a battery).

For example, in addition to the photoelectric sensor as illustrated in FIG. 1, a proximity sensor, a limit switch, and the like are included as the sensing device. Further, a sensing device configured to output an analog signal as a measurement signal such as a flow rate sensor, a temperature sensor, a current sensor, a voltage sensor, or an acceleration sensor may be adopted.

Further, a signal may be externally output from the sensor tag 200. For example, a light emitting diode (LED), a speaker, a vibrator, and the like may be arranged to perform an external output in accordance with the signal output from the control circuit 214.

The power supply circuit 240 rectifies the electromagnetic waves received by the antenna 230, thereby generating electric power necessary for an operation of the sensor tag 200.

Although the hardware configuration of the sensor tag 200 is shown from a functional point of view in FIG. 3, any mounting form can actually be adopted in accordance with required performance and application.

Figure 4A:
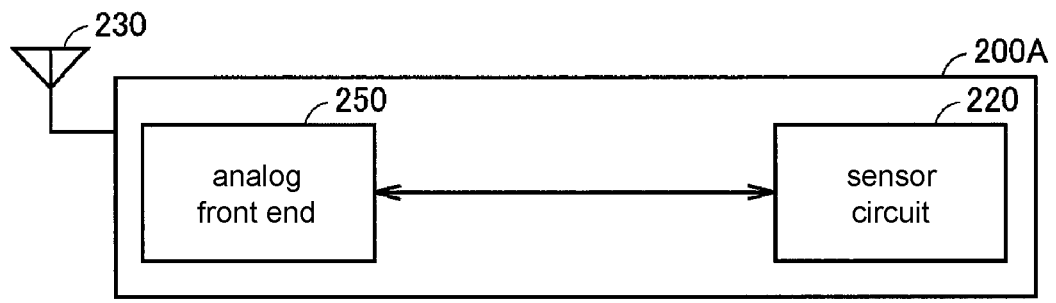
FIG. 4A, FIG. 4B and FIG. 4C are schematic diagrams illustrating an example of a mounting form of a sensor tag constituting the wireless sensor system according to the present embodiment.
Figure 4B:
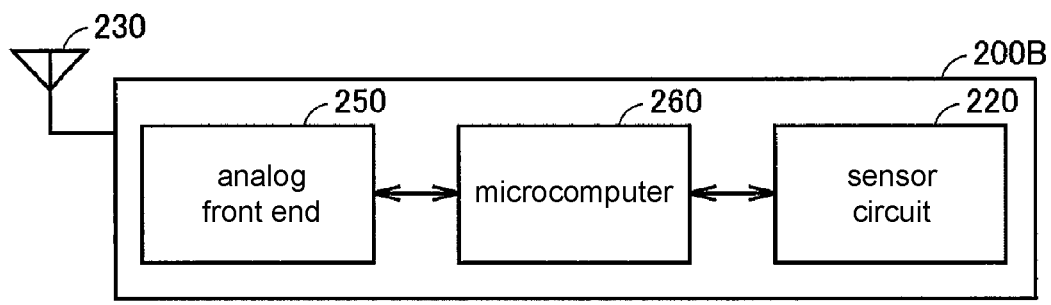
Figure 4C:
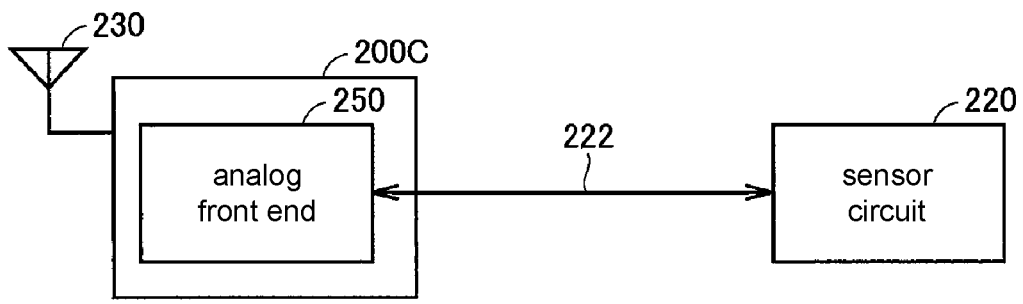
Figure 5A:
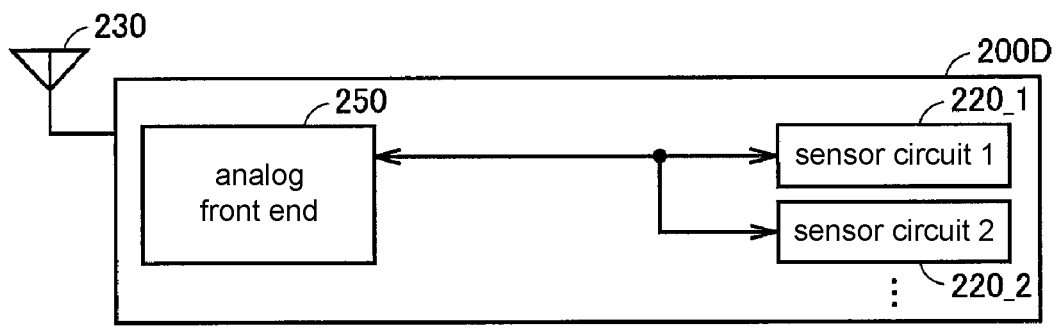
FIG. 5A, FIG. 5B and FIG. 5C are schematic diagrams illustrating an example of a mounting form of a sensor tag constituting the wireless sensor system according to the present embodiment.
Figure 5B:
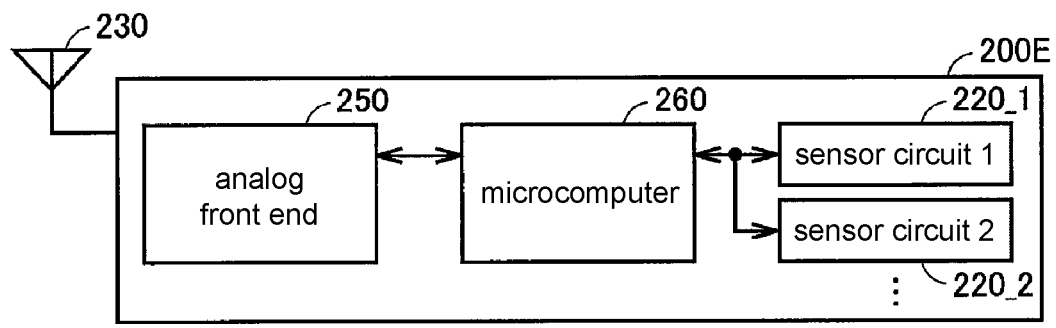
Figure 5C:
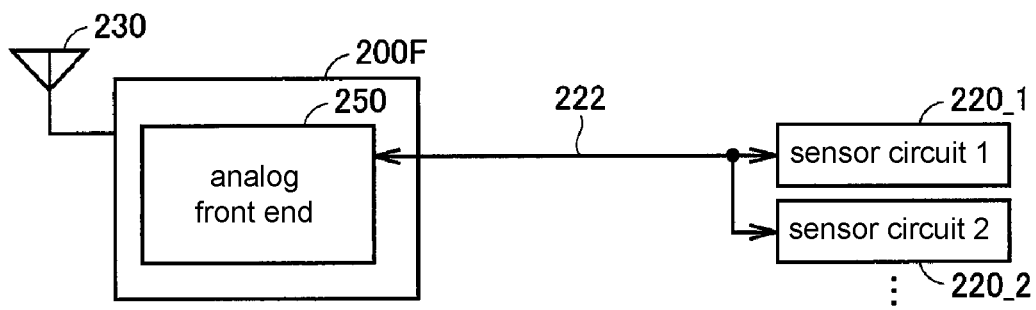

FIGS. 4A to 5C are schematic views illustrating examples of mounting forms of the sensor tag 200 constituting the wireless sensor system 1 according to the present embodiment. A mounting example including a single sensor circuit in one sensor tag 200 is illustrated in FIG. 4A, FIG. 4B and FIG. 4C and a mounting example including a plurality of sensor circuits in one sensor tag 200 is illustrated in FIG. 5A, FIG. 5B and FIG. 5C.

A sensor tag 200A illustrated in FIG. 4A includes an analog front end 250 and a sensor circuit 220 within a housing including the antenna 230. In the analog front end 250, the processing circuit 210 and the power supply circuit 240 illustrated in FIG. 3 are mounted.

A sensor tag 200B illustrated in FIG. 4B includes an analog front end 250, a microcomputer 260, and a sensor circuit 220 within a housing including the antenna 230. In the analog front end 250, the demodulation circuit 212, the modulation circuit 213, and the power supply circuit 240 illustrated in FIG. 3 are mounted. The microcomputer 260 provides a function corresponding to the control circuit 214 illustrated in FIG. 3.

A sensor tag 200C illustrated in FIG. 4C includes an analog front end 250 within a housing including the antenna 230. The sensor circuit 220 is configured separately from the sensor tag 200C. An external sensor interface 222 is provided between the sensor tag 200C and the sensor circuit 220. In the analog front end 250, the processing circuit 210 and the power supply circuit 240 illustrated in FIG. 3 are mounted.

A sensor tag 200D illustrated in FIG. 5A includes an analog front end 250 and a plurality of sensor circuits 220_1, 220_2, . . . within a housing including the antenna 230. In the analog front end 250, the processing circuit 210 and the power supply circuit 240 illustrated in FIG. 3 are mounted.

A sensor tag 200E illustrated in FIG. 5B includes an analog front end 250, a microcomputer 260, and a plurality of sensor circuits 220_1, 220_2, . . . within a housing including the antenna 230.

A sensor tag 200F illustrated in FIG. 5C includes an analog front end 250 within a housing including the antenna 230. A plurality of sensor circuits 220_1, 220_2, . . . are arranged separately from the sensor tag 200F. An external sensor interface 222 is provided between the sensor tag 200F and each of the plurality of sensor circuits 220_1, 220_2, . . .

The present disclosure is not limited to the mounting examples illustrated in FIGS. 4 and 5, and any mounting form can be adopted.

D. Outline of Operation of Wireless Sensor System

Figure 6:
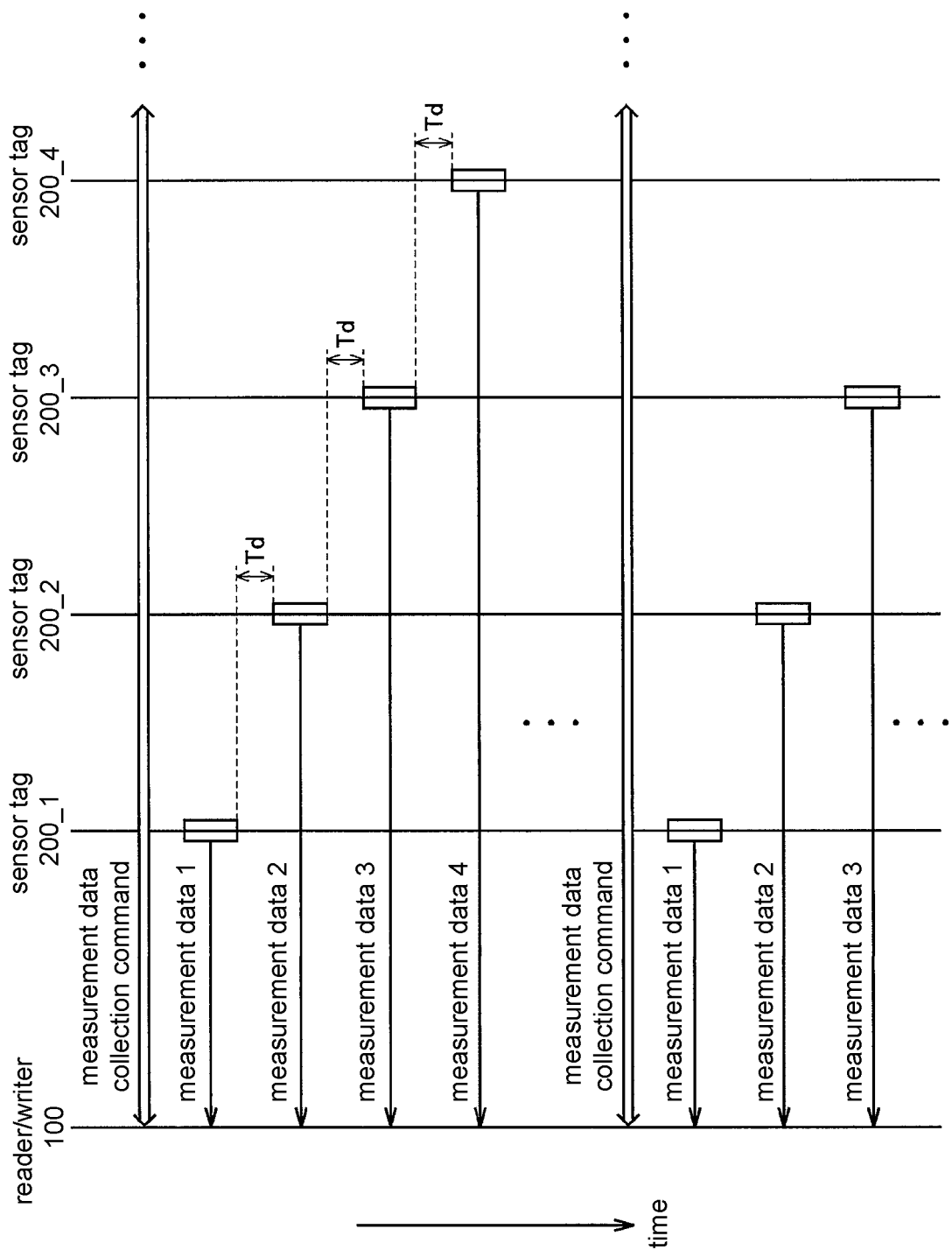
FIG. 6 is a sequence diagram illustrating an outline of an operation of the wireless sensor system according to the present embodiment.

Next, an outline of an operation of the wireless sensor system 1 according to the present embodiment will be described. FIG. 6 is a sequence diagram illustrating an outline of an operation of the wireless sensor system 1 according to the present embodiment. An example of exchanges between the four sensor tags 200_1 to 200_4 and the reader/writer 100 is illustrated as one example in FIG. 6.

Referring to FIG. 6, the reader/writer 100 transmits a measurement data collection command to a plurality of sensor tags 200_1 to 200_4. Although only a specific sensor tag 200 can be designated in the measurement data collection command as will be described below, an example in which the measurement data collection command is transmitted to all the sensor tags 200 is illustrated in FIG. 6.

When the measurement data collection command from the reader/writer 100 is received, each of the sensor tags 200_1 to 200_4 activates the internal circuit, acquires a measurement signal from the corresponding sensor circuit, and responds to the reader/writer 100 with measurement data based on the acquired measurement signal. At this time, if the sensor tags 200_1 to 200_4 respond simultaneously, the reader/writer 100 cannot appropriately perform a reception process.

Therefore, in the wireless sensor system 1 according to the present embodiment, each of the sensor tags 200_1 to 200_4 responds with measurement data after a response delay elapses. The response delay is preset so that overlapping does not occur between the sensor tags 200 that simultaneously receive the measurement data collection command from the same reader/writer 100. As a method of setting such a response delay, unique identification information may be preset in each of the sensor tags 200_1 to 200_4 and the response delay of each sensor tag 200 may be calculated from the set identification information.

In the example illustrated in FIG. 6, when the measurement data collection command from the reader/writer 100 is received, the sensor tag 200_1 responds to the reader/writer 100 with measurement data 1 based on the measurement signal from its own sensor circuit. Subsequently, the sensor tag 200_2 responds to the reader/writer 100 with measurement data 2 based on the measurement signal from its own sensor circuit only after a response delay Td from the response of the sensor tag 200_1. Subsequently, the sensor tag 200_3 responds to the reader/writer 100 with measurement data 3 based on the measurement signal from its own sensor circuit only after the response delay Td from the response of the sensor tag 200_2. Finally, the sensor tag 200_4 responds to the reader/writer 100 with measurement data 4 based on the measurement signal from its own sensor circuit only after the response delay Td from the response of the sensor tag 200_3.

Measurement data from the sensor tags 200_1 to 200_4 can be collected with one measurement data collection command by making each response delay at which the response of such measurement data starts different.

Such a series of measurement data collection processes is executed at an appropriate timing. Also, the measurement data collection command from the reader/writer 100 may be periodically transmitted or may be transmitted every time in response to a request from a host device or the like.

E. Wireless Communication Protocol

Next, a wireless communication protocol adopted by the wireless sensor system 1 according to the present embodiment will be described.

At the time of creation of the present specification, ISO 18000-6 has been standardized as a radio communication protocol in the UHF band between the reader/writer and the RF tag. ISO 18000-6 is a standard corresponding to Class 1 Generation 2 (Gen 2) of an EPCglobal network system.

From the viewpoint of implementation of secure communication or the like, ISO 18000-6 is defined as a wireless communication protocol between the reader/writer and the RF tag so that five states defined according to each session sequentially transition. Specifically, there are five states including a ready state, an acknowledged state, an open state, a secured state, and a killed state.

That is, in order for the reader/writer to exchange data with the RF tag, it is necessary to repeat the transmission of the command signal and the reception of the response signal to cause the state of the RF tag to sequentially transition.

Although a wireless communication protocol defined in ISO 18000-6 is preferable in the sense that secure communication can be implemented, there is a possibility that a requirement designated in terms of a real-time property will not be satisfied if the system is adopted as a wireless sensor system. That is, in an existing sensor configured to transmit measurement data via a wired signal, its response time is about several msec even when the response time is long. Also, in the wireless sensor system, it is preferable to implement a response property (a real-time property) similar to that of the existing sensor via the wired signal.

In the wireless sensor system 1 according to the present embodiment, by adopting a wireless communication protocol more simplified than the wireless communication protocol defined in ISO 18000-6, it is possible to implement a response property (a real-time property) required for a system configured to collect measurement data from the sensor.

FIG. 7A and FIG. 7B are time charts illustrating a sequence in the wireless sensor system 1 according to the present embodiment. A sequence when the wireless sensor system 1 is configured in accordance with ISO 18000-6 is illustrated in FIG. 7A as a comparative example and a sequence in the wireless sensor system 1 according to the present embodiment is illustrated in FIG. 7B.

Referring to FIG. 7A, if the wireless sensor system 1 is configured in accordance with ISO 18000-6, the reader/writer first selects a sensor tag serving as a collection object of measurement data (sequence SQ10). Subsequently, the reader/writer transmits an inquiry command (sequence SQ11). In response to this inquiry command, the sensor tag responds to the reader/writer with a 16-bit random number (RN16) used when communication with the reader/writer is performed (sequence SQ12).

When the 16-bit random number is received from the sensor tag, the reader/writer transmits an acknowledgment (ACK) response to the sensor tag (sequence SQ13). In response to this ACK response, the sensor tag responds to the reader/writer with its own electronic product code (EPC), a protocol control (PC) code, and a checksum (cyclic redundancy check (CRC)) (sequence SQ14).

When a code is received from the sensor tag, the reader/writer transmits an inquiry command including a previously received 16-bit random number (sequence SQ15). In response to this inquiry command, the sensor tag responds to its reader/writer with its own handle value (handle) (sequence SQ16).

When the handle value is received from the sensor tag, the reader/writer transmits a measurement data collection command (Start Sensing) to the sensor tag (sequence SQ17). In response to this measurement data collection command, the sensor tag responds to the reader/writer with measurement data based on the measurement signal from the sensor circuit (sequence SQ18).

On the other hand, in the wireless sensor system 1 according to the present embodiment illustrated in FIG. 7B, the reader/writer 100 transmits a measurement data collection command (Get GPI) to the sensor tag (sequence SQ21). In response to the measurement data collection command, the sensor tag responds to the reader/writer with measurement data based on the measurement signal from the sensor circuit (sequence SQ22).

That is, in the wireless sensor system 1 according to the present embodiment, a sequence for establishing communication between the reader/writer 100 and the sensor tag 200 is omitted. By adopting such a simplified sequence, a response property (a real-time property) can be improved.

In the wireless sensor system 1 according to the present embodiment, the measurement data collection command (Start Sensing) transmitted from the reader/writer 100 includes designation information for designating the sensor tag 200 serving as an object from which measurement data is collected. Even if the plurality of sensor tags 200 simultaneously receive the measurement data collection command, no problem such as collision occurs because only the selected sensor tag 200 responds with measurement data.

As described below, a group ID (SelectedGr) and an individual ID (SelectedID) can be used as the designation information.

F. Data Stored by Sensor Tag

Next, data stored by the sensor tag 200 will be described. Each of the sensor tags 200 stores identification information capable of being distinguished from that of other sensor tags 200.

Figure 8:
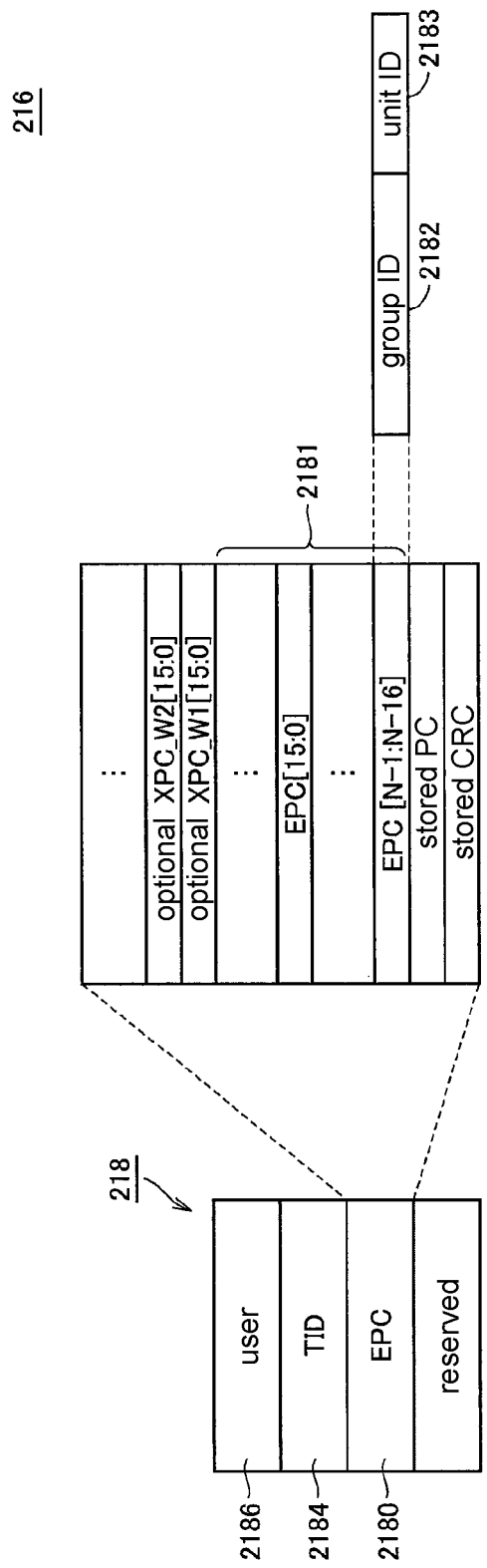
FIG. 8 is a diagram illustrating an example of a data structure held by a sensor tag in the wireless sensor system according to the present embodiment.

FIG. 8 is a diagram illustrating an example of a data structure held by the sensor tag 200 in the wireless sensor system 1 according to the present embodiment. The data structure illustrated in FIG. 8 is based on ISO 18000-6.

Referring to FIG. 8, a memory bank 218 arranged in the storage unit 216 includes an electronic product code (EPC) area 2180, a tag ID (TID) area 2184, and a user data area 2186. In the TID area 2184, information for identifying each sensor tag 200 is stored. In the user data area 2186, any user data is stored.

In addition to a checksum (Stored CRC) and a PC code (Stored PC), EPC data 2181 which is identification information of the sensor tag 200 is stored in the EPC area 2180. In the wireless sensor system 1 according to the present embodiment, a group ID 2182 and an individual ID (a unit ID) 2183 are included as a part of the EPC data 2181. A value stored in the group ID 2182 corresponds to first identification information indicating a group to which each sensor tag 200 belongs and a value stored in the individual ID 2183 corresponds to second identification information for specifying each sensor tag 200. The group ID and the individual ID may be stored in the user data area 2186.

Between one or more sensor tags 200 arranged in a range in which command signals can be received from the same reader/writer 100 (for example, a range from about several meters to several tens of meters around the reader/writer 100), a combination of the group ID 2182 and the individual ID 2183 is preset to be unique.

Also, it is not necessary to use both the group ID 2182 and the individual ID 2183, and only the individual ID 2183 may be used. Also, from the viewpoint of controlling the response delay as described below, it is preferable to assign the individual ID 2183 so that the individual ID 2183 is incremented (for example, by 1) every predetermined number between the sensor tags 200 capable of receiving the same command signal.

G. Command Signal/Response Signal

Next, an example of command signals exchanged between the reader/writer 100 and the sensor tag 200 will be described.

FIG. 9A and FIG. 9B are diagrams illustrating an example of a data structure of a command signal and a response signal exchanged in the wireless sensor system 1 according to the present embodiment. An example of a data arrangement of a measurement data collection command 300 is illustrated in FIG. 9A and an example of a data arrangement of a response signal 320 to the measurement data collection command 300 is illustrated in FIG. 9B.

The measurement data collection command 300 illustrated in FIG. 9A stores some data, and each piece of data is defined by a predetermined number of bits. More specifically, the measurement data collection command 300 includes a preamble part 302, a command part 304, a group ID part 306, an individual ID part 308, and a checksum part 310.

The preamble part 302 stores a data string indicating a command signal and/or a data string indicating a head of the command signal.

A data string indicating details of a command given to the sensor tag 200 is stored in the command part 304.

Designation information (hereinafter also referred to as a "group ID") for designating a group to which one or more sensor tags 200 serving as objects from which measurement data is collected belong is stored in the group ID part 306. Designation information (hereinafter also referred to as "individual ID") for designating one sensor tag 200, which is an object from which measurement data is collected, is stored in the individual ID part 308. That is, the designation information in the measurement data collection command 300 includes a group ID serving as first designation information for designating an object group and a group ID serving as second designation information for separately designating the targeted sensor tag 200 ID.

In the checksum part 310, a checksum for determining whether or not an error is included in the received command signal at a receiving side of the command signal is stored.

By adopting a data structure as illustrated in FIG. 9A as a measurement data collection command which is an example of a command signal, it is possible to include designation information (a group ID and/or an individual ID) for designating the sensor tag 200 serving as an object of the measurement data.

When the measurement data collection command 300 is received from the reader/writer 100, the sensor tag 200 compares the group ID and the individual ID stored in the group ID part 306 and the individual ID part 308 in the received measurement data collection command with the group ID 2182 and the individual ID 2183 included in the EPC data 2181 to determine whether or not the measurement data collection command is addressed to the sensor tag 200.

H. State Transition of Sensor Tag

Next, an example of state transition in the sensor tag 200 in the wireless sensor system 1 according to the present embodiment will be described.

Figure 10:
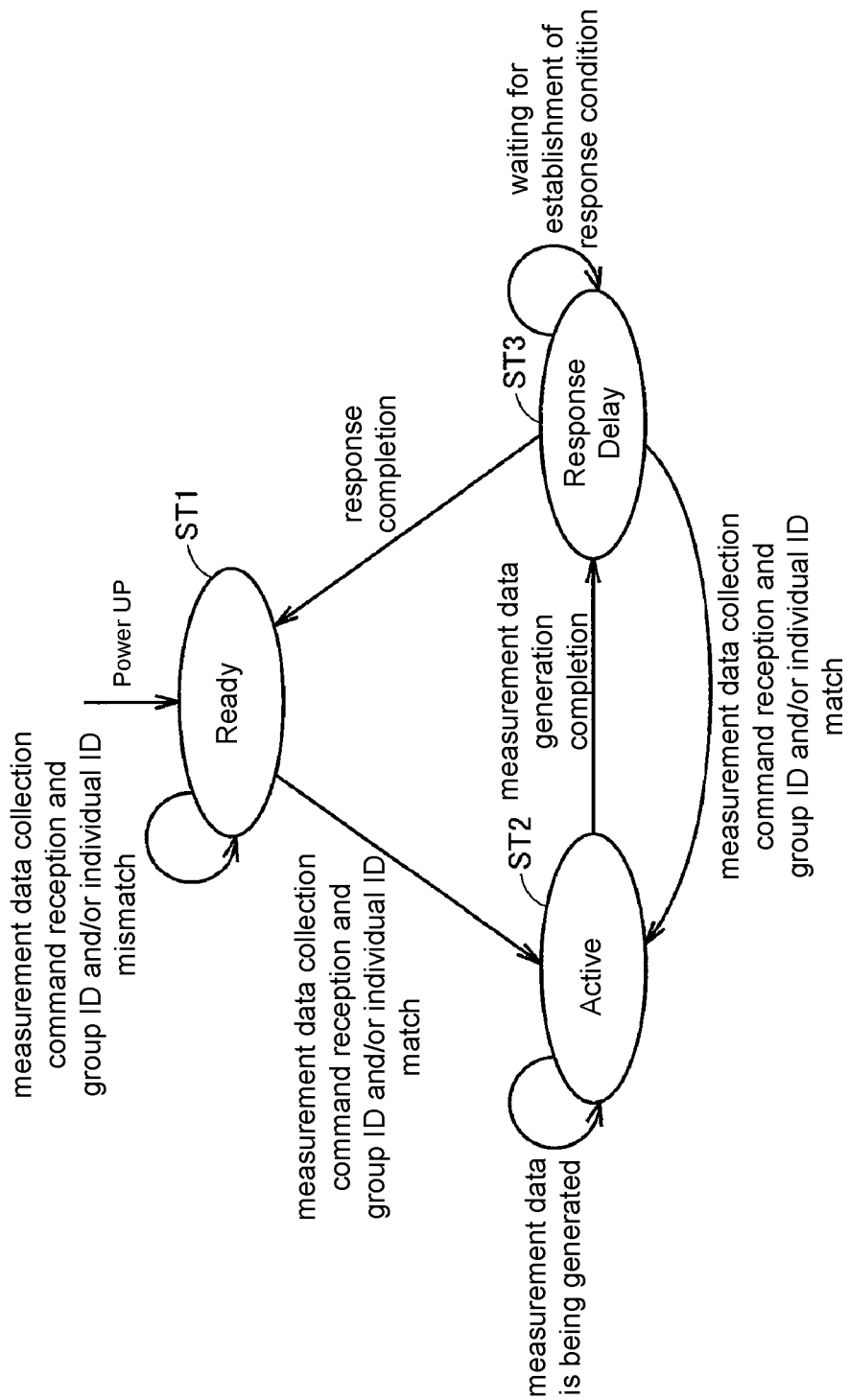
FIG. 10 is a diagram illustrating an example of state transition in a sensor tag in the wireless sensor system according to the present embodiment.

FIG. 10 is a diagram illustrating an example of state transition in the sensor tag 200 in the wireless sensor system 1 according to the present embodiment. Referring to FIG. 10, when the measurement data collection command (Get GPI) is received from the reader/writer 100, the sensor tag 200 is activated by receiving electric power obtained by the measurement data collection command and first transitions to a ready state ST1. Then, on the basis of the group ID and the individual ID included in the received measurement data collection command, the sensor tag 200 determines whether or not the received measurement data collection command is addressed to the sensor tag 200. In other words, if the group ID and/or the individual ID included in the measurement data collection command does not match the group ID 2182 and/or the individual ID 2183 (see FIG. 9A and FIG. 9B) stored in the memory bank 218 of the storage unit 216, the ready state ST1 is maintained until the power supply is interrupted.

On the other hand, if the group ID and/or the individual ID included in the measurement data collection command matches the group ID 2182 and/or the individual ID 2183 stored in the memory bank 218 of the storage unit 216, the sensor tag 200 transitions to an active state ST2.

In the active state ST2, the sensor tag 200 generates measurement data on the basis of a measurement signal from the corresponding sensor circuit. When generation of measurement data is completed, the sensor tag 200 transitions to a response delay state ST3.

As shown in the continuous transition from the ready state ST1 to the active state ST2 and the response delay state ST3, each of the sensor tags 200 generates measurement data on the basis of a measurement signal if the designation information (a group ID and/or an individual ID) included in the command signal received from the reader/writer 100 (the communication device) matches its own stored identification information.

In the response delay state ST3, it waits for a response of the measurement signal until a predetermined mined response start condition is satisfied. That is, a transmission timing of the response signal including the measurement signal is delayed in accordance with whether or not the predetermined response start condition is satisfied. In the present specification, the "response start condition" means a condition for permitting transmission of a response signal in each of the sensor tags 200. Some examples of the response start condition will be described in detail below.

When the predetermined response start condition is satisfied, the sensor tag 200 transmits the response signal including the generated measurement data to the reader/writer 100. After the transmission of the response signal, the sensor tag 200 returns to the ready state ST1. In this manner, each of the sensor tags 200 starts the transmission of a response signal including generated measurement data when the predetermined response start condition is satisfied.

Also, a measurement data collection command (Get GPI) is newly received from the reader/writer 100 in the response delay state ST3 and the sensor tag 200 newly starts a process by transitioning to the active state ST2 again if a group ID and/or individual ID included in the received measurement data collection command matches a group ID 2182 and/or an individual ID 2183 stored in the memory bank 218 of the storage unit 216.

Also, if it is determined that there is no transition from the ready state ST1, a process of pausing the operation of the sensor tag 200 may be performed.

I. Selection of Sensor Tag

Next, a configuration and a process for collecting measurement data by selecting a specific sensor tag 200 from the reader/writer 100 will be described.

Figure 11A:
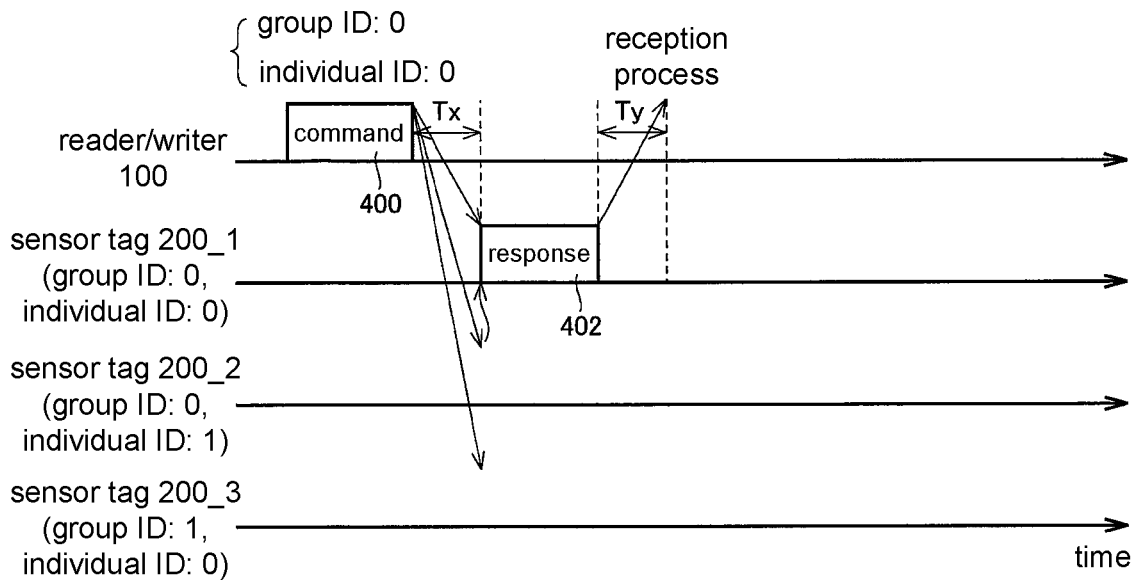
FIG. 11A and FIG. 11B are time charts illustrating a processing procedure when measurement data is collected from one sensor tag in the wireless sensor system according to the present embodiment.
Figure 11B:
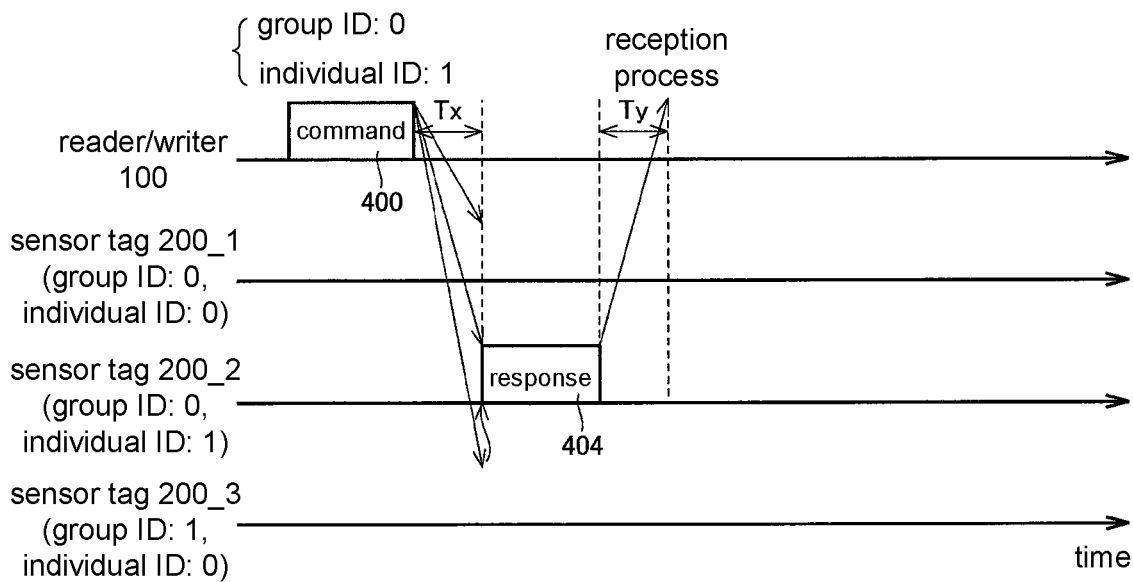

FIG. 11A and FIG. 11B are time charts illustrating a processing procedure when measurement data is collected from one sensor tag 200 in the wireless sensor system 1 according to the present embodiment. Referring to FIG. 11A and FIG. 11B, an example in which three sensor tags 200_1 to 200_3 are arranged for one reader/writer 100 is assumed.

It is assumed that the same group ID "0" is set in the sensor tags 200_1 and 200_2, and another group ID "1" is set in the sensor tag 200_3. It is assumed that "0" and "1" are set as the individual IDs in the sensor tags 200_1 and 200_2 so that no collision occurs in the same group. Also, it is assumed that "0" is set as the individual ID in the sensor tag 200_3.

FIG. 11A illustrates an example in which the measurement data collection command 400 in which the group ID "0" and the individual ID "0" are designated is transmitted. In this case, because valid values are set for both the group ID and the individual ID in the measurement data collection command, only the sensor tag 200 in which both the group ID and the individual ID match will provide a response. In the example illustrated in FIG. 11A, only the sensor tag 200_1 matching both the group ID and the individual ID designated in the measurement data collection command will provide a response.

That is, when a predetermined transmission time Tx has elapsed after the transmission of the measurement data collection command 400, the sensor tag 200_1 generates measurement data on the basis of a measurement signal from a corresponding sensor circuit, and transmits a response signal 402 including the generated measurement data. A reception process in the reader/writer 100 is executed when a predetermined processing delay time Ty has elapsed after the transmission of the response signal 402.

According to the series of processes as described above, one process of collecting measurement data from the sensor tag 200_1 is completed.

On the other hand, an example in which the measurement data collection command 400 in which the group ID "0" and the individual ID "1" are designated is transmitted is illustrated in FIG. 11B. In this case, because valid values are set for both the group ID and the individual ID in the measurement data collection command, only the sensor tag 200 in which both the group ID and the individual ID match will provide a response. In the example illustrated in FIG. 11B, only the sensor tag 200_2 matching both the group ID and the individual ID designated in the measurement data collection command provides a response and transmits a response signal 404 including generated measurement data.

A process of transmitting the response signal including the measurement data is similar to the process as described above.

In the processing example illustrated in FIGS. 11A and 11B described above, each of the sensor tags 200 performs the generation of the measurement data and the transmission of the response signal if its own stored group ID (first identification information) matches a group ID (first designation information) included in designation information within the measurement data collection command 40 and its own stored individual ID (second identification information) matches an individual ID (second designation information) included in the designation information.

J. Adjustment of Response Delay

A processing procedure when measurement data is collected from one sensor tag 200 is illustrated in FIG. 11A and FIG. 11B. In FIGS. 11A and 11B, after a measurement data collection command 400 is received, both the sensor tags 200_1 and 200_2 immediately start a process related to the transmission of the response signal without causing a response delay. Because only one sensor tag 200 is specified if a measurement data collection command in which both the group ID and the individual ID are designated is transmitted, it is unnecessary to cause a response delay.

That is, if each of the sensor tags 200 receives the measurement data collection command in which both the group ID and the individual ID are designated, each of the sensor tags 200 starts a measurement data transmission process without causing a response delay. In this case, because the above-described response start condition is always satisfied, the sensor tag 200 substantially immediately transitions to the "ready state ST1" even if the transition from the "active state ST2" to the "response delay state ST3" illustrated in FIG. 10 described above is performed.

On the other hand, if measurement data is collected from a plurality of sensor tags 200 by using the same measurement data collection command, a collision may be caused by the sensor tags 200 providing responses at the same time. An example of a method of adjusting a response delay in each sensor tag 200 to prevent such a collision from occurring will be described.

(j1: Method in which Reader/Writer 100 Controls Response Delay)

Figure 12:
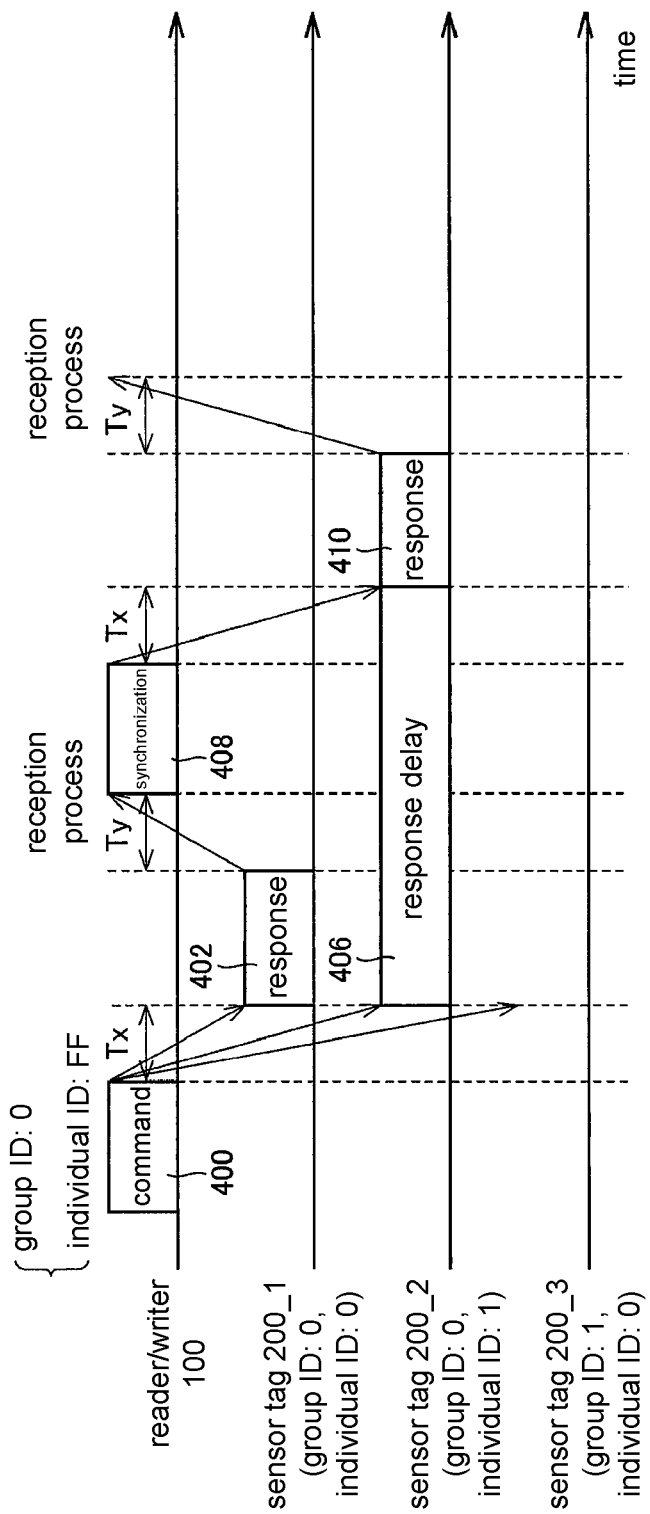
FIG. 12 is a time chart illustrating a processing procedure when measurement data is collected from a plurality of sensor tags in the wireless sensor system according to the present embodiment.

FIG. 12 is a time chart illustrating a processing procedure when measurement data is collected from a plurality of sensor tags 200 in the wireless sensor system 1 according to the present embodiment. Settings similar to those in FIG. 11A and FIG. 11B are assumed to be preset in the sensor tags 200_1 to 200_3 illustrated in FIG. 12.

An example in which a measurement data collection command 400 with a valid group ID "0" and an invalid individual ID "FF" that are designated is transmitted is illustrated in FIG. 12. In this case, because a valid value is set only in the group ID in the measurement data collection command, one or more sensor tags 200 matching the group ID provide a response. In the example illustrated in FIG. 12, the sensor tags 200_1 and 200_2 matching the group ID designated in the measurement data collection command will provide responses.

That is, in the processing example illustrated in FIG. 12, each of the sensor tags 200 performs the generation of the measurement data and the transmission of the response signal if its own stored group ID (first identification information) matches a group ID (first designation information) included in designation information within the measurement data collection command 400. Specifically, when the transmission time Tx has elapsed after the transmission of the measurement data collection command 400 by the reader/writer 100, each of the sensor tags 200_1 and 200_2 generates measurement data on the basis of the measurement signal from the corresponding sensor circuit.

When generation of measurement data is completed if its own stored individual ID (second identification information) is a value indicating the head of a response, each of the sensor tags 200 starts the transmission of a response signal without causing a response delay. The "value indicating the head of the response" corresponds to a value having a meaning indicating that a response should be first provided in any identification information indicating the response order within the same group. As a simple example, if the value of the individual ID is regarded as corresponding to the response order, the sensor tag 200 having a smallest individual ID will first provide a response.

As an example, if the individual ID defines "0" as a smallest value, because the sensor tag 200_1 has the individual ID "0," the sensor tag 200_1 transmits the response signal 402 including the generated measurement data without causing a response delay. The reception process in the reader/writer 100 is executed after the passage of a predetermined processing delay time Ty from the transmission of the response signal 402.

On the other hand, each of the sensor tags 200 starts the transmission of the response signal after waiting until the number of times that an additional command signal is transmitted from the reader/writer 100 and the value indicated by its own stored individual ID (second identification information) satisfy a predetermined relationship if its own stored individual ID (second identification information) is not a value indicating the head of the response. The "additional command signal" is a type of trigger for defining a transmission timing of the response signal to the sensor tag 200 other than the first responding sensor tag 200.

In this manner, if a plurality of sensor tags 200 transmit response signals, each sensor tag 200 transmits a response signal at a predetermined timing in accordance with its own individual ID and an additional command signal from the reader/writer 100. That is, the above-described response start condition is based on the individual ID of each sensor tag 200 and the additional command signal from the reader/writer 100.

In the example illustrated in FIG. 12, when a response signal from the sensor tag 200_1 is received, the reader/writer 100 transmits a frame synchronization signal 408 as an additional command signal to the measurement data collection command 400. After reception of the measurement data collection command 400, the sensor tag 200_2 in which the individual ID is set to "1" starts the transmission of a response signal 410 when the first frame synchronization signal 408 is received. That is, the sensor tag 200_2 is in a state (response delay 406) in which transmission of a response signal is awaited until the first frame synchronization signal 408 after receiving the measurement data collection command 400.

Although not illustrated, if a sensor tag 200 having an individual ID "2" exists, the frame synchronization signal 408 is further transmitted from the reader/writer 100 and the sensor tag 200 having the individual ID of "2" starts the transmission of a response signal.

In this manner, after the reception of the measurement data collection command 400, the transmission timing of the response signal 410 and the like are controlled according to the number of transmissions and a timing of transmission of the frame synchronization signal 408. That is, the response start condition in each of the sensor tags 200 is defined by the individual ID set in each sensor tag 200 and the number of receptions of the frame synchronization signal 408.

According to the series of processes as described above, a process of collecting the measurement data from the sensor tags 200_1 and 200_2 is completed.

Although an example of a process of determining a transmission timing of a response signal (that is, a length of a response delay) by determining the number of transmissions of the frame synchronization signal 408 after the transmission of the measurement data collection command 400 at the sensor tag 200 side is illustrated in the time chart illustrated in FIG. 12, the individual ID of the sensor tag 200 serving as an object for permitting the transmission of the response signal may be designated in the frame synchronization signal 408 (that is, the additional command signal). For example, in the time chart illustrated in FIG. 12, by designating "1" as the individual ID in the frame synchronization signal 408, the sensor tag 200_2 having an individual ID of "1" may be configured to start the transmission of the response signal.

(j2: Scheme in which each of Sensor Tags 200 Controls Response Delay)

Although the reader/writer 100 controls a response delay in each sensor tag 200 by controlling the number of transmissions and a transmission timing of the frame synchronization signal 408 in the processing example illustrated in FIG. 12, each of the sensor tags 200 may be configured to autonomously determine its own response delay.

Figure 13:
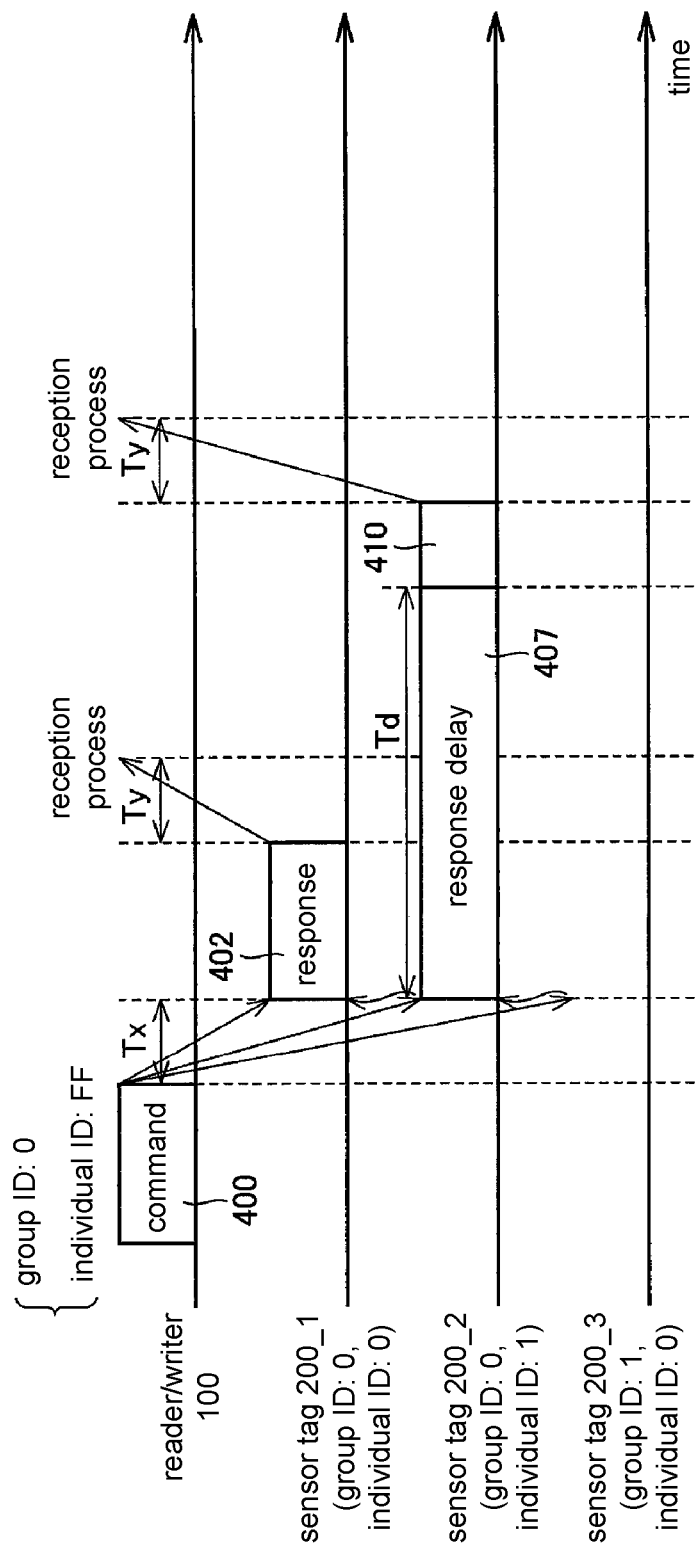
FIG. 13 is a time chart illustrating another processing procedure when measuring data is collected from a plurality of sensor tags in the wireless sensor system according to the present embodiment.

FIG. 13 is a time chart illustrating another processing procedure when measurement data is collected from a plurality of sensor tags 200 in the wireless sensor system 1 according to the present embodiment. Settings similar to those in FIG. 12 are assumed to be preset in the sensor tags 200_1 to 200_3 illustrated in FIG. 13.

In the processing procedure illustrated in FIG. 13, each sensor tag 200 determines the length of response delay on the basis of its own individual ID. For example, a unit time length of a predetermined response delay is preset in each sensor tag 200, and each sensor tag 200 determines a time length of the response delay by multiplying a value of its own individual ID by the unit time length of the response delay.

For example, the response delay time is calculated as "0" in the sensor tag 200_1 in which the individual ID "0" is set and a response delay Td obtained by multiplying a unit time length Td of the response delay by "1" is determined in the sensor tag 200_2 in which the individual ID "1" is set. Although not illustrated, if there is a sensor tag 200 having an individual ID of "2," the response delay is determined to be "2×Td."

Because individual IDs are uniquely set in the sensor tags 200 in which the same group ID is set, different response delays are calculated in the sensor tags 200. In this manner, by using different response delays, it is possible to prevent a collision from being caused by simultaneous transmission of response signals from the plurality of sensor tags 200. In this manner, in the processing procedure illustrated in FIG. 13, the above-described response start condition is based on the individual ID of each sensor tag 200.

In this manner, each of the sensor tags 200 starts the transmission of the response signal after waiting for a period in time determined on the basis of a value indicated by its own stored individual ID (second identification information).

By calculating the response delay as described above in each sensor tag 200, when a transmission time Tx has elapsed after the transmission of the measurement data collection command 400 by the reader/writer 100, each of the sensor tags 200_1 and 200_2 generates measurement data on the basis of a measurement signal from a corresponding sensor circuit. Then, the sensor tag 200_1 transmits the response signal 402 including the generated measurement data without generating the response delay. On the other hand, the sensor tag 200_2 starts the transmission of the response signal 410 after waiting for the response delay Td (response delay 407) calculated on the basis of the individual ID.

In this manner, in the processing example illustrated in FIG. 13, different response delays are calculated on the basis of individual IDs set for the sensor tags 200 and a transmission timing of a response signal is adjusted in accordance with each calculated response delay.

K. Response Signal

Next, a response signal including measurement data from the sensor tag 200 will be described.

(k1: Measurement Data)

As measurement data to be included in the response signal, analog data indicating a measured value may be used in addition to digital data indicating either one of ON/OFF. Although it is only necessary to allocate at least one bit to one piece of data in the case of digital data, it is preferable to use more bits so that error detection and/or error correction are possible in consideration of noise immunity because of data transmission via wireless communication.

Also, a plurality of measurement values sampled in the same sensor circuit at intervals shorter than a transmission cycle of the measurement data collection command as well as measurement data collected at one measurement timing may be collectively transmitted. By adopting such a method, it is possible to perform sampling (oversampling) at intervals shorter than the collection cycle of the measurement data using the measurement data collection command.

In this manner, information about a plurality of measurement signals collected at different timings may be included in the response signal.

Also, if analog data is transmitted, quantization is performed in a dynamic range according to the number of bits assigned to each measurement value. If the number of assigned bits is small, measurement data may be generated after pre-processing such as averaging or peak detection is performed on the measurement signal from the sensor circuit. On the other hand, if a sufficiently large number of bits are assigned, oversampling as described above may be performed.

(k2: Specification of Sensor Tag of Transmission Source)

As illustrated in FIGS. 12 and 13 described above, even when a plurality of sensor tags 200 transmit response signals with respect to the same measurement data collection command, it is possible to basically specify the sensor tag 200 of the transmission source on the basis of an order of reception and a reception timing of the response signal.

Figure 14A:
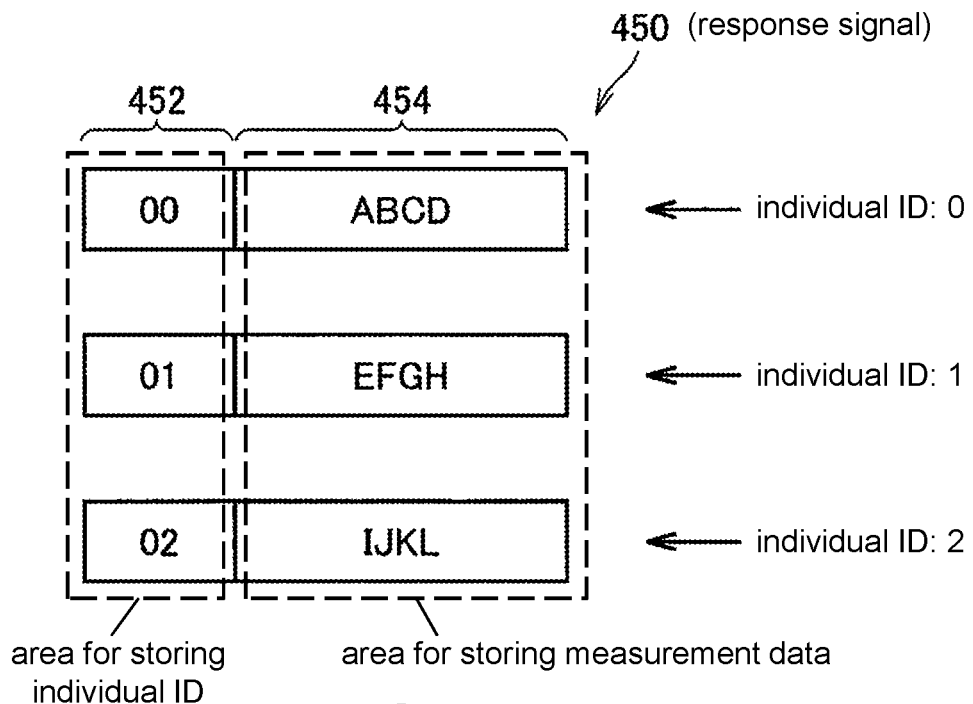
FIG. 14A and FIG. 14B are diagrams illustrating an example of a response signal in the wireless sensor system according to the present embodiment.
Figure 14B:
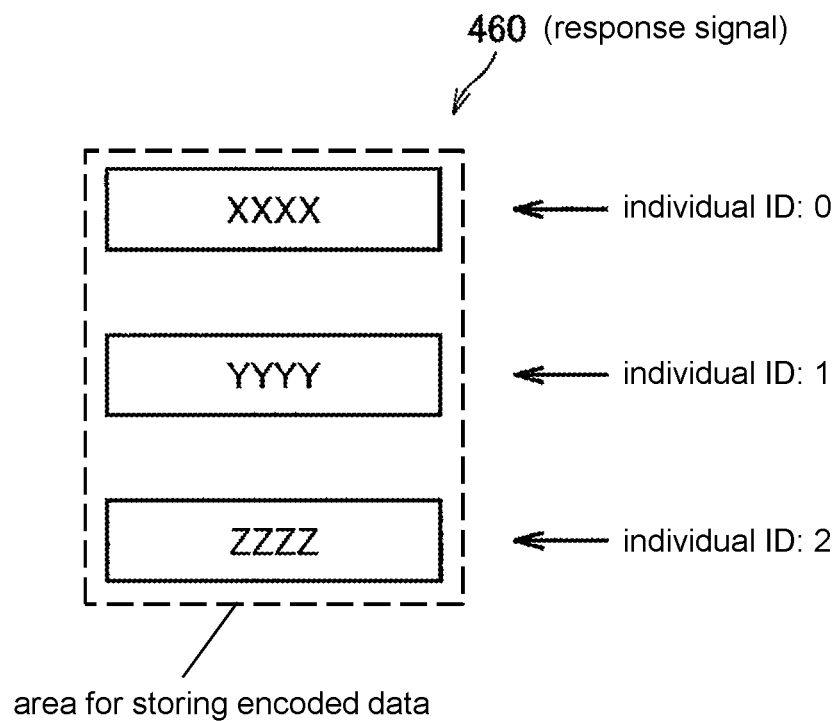

However, in order to avoid an influence of jitter or the like occurring in the response signal, the response signal may include information for specifying the sensor tag 200 of the transmission source. FIG. 14A and FIG. 14B are diagrams illustrating an example of a response signal in the wireless sensor system 1 according to the present embodiment.

A response signal 450 illustrated in FIG. 14A includes a value indicating the individual ID of the sensor tag 200 of the transmission source. That is, the response signal 450 includes an area 452 configured to store the individual ID of the sensor tag 200 of the transmission source and an area 454 configured to store the measurement data. When such a response signal 450 is received, the reader/writer 100 can specify the sensor tag 200 of the transmission source on the basis of a value stored in the area 452 of the received response signal 450.

The response signal 460 illustrated in FIG. 14B may be configured to store encoded data obtained by encoding measurement data by using unique information (for example, a unique data string including a group ID and an individual ID) of the sensor tag 200 of the transmission source. When any response signal 460 is received, the reader/writer 100 attempts to perform decoding using preset identification information of the sensor tag 200 and specifies the sensor tag 200 of the transmission source on the basis of its success or failure. By adopting a data structure as in the response signal 460 illustrated in FIG. 14B, the necessary amount of data can be reduced as compared with the data structure as illustrated in FIG. 14A.

(k3: Notification of Sensor Tags Out of Setting)

In the wireless sensor system 1 according to the present embodiment, identification information is preset in the sensor tag 200 which performs an exchange with the reader/writer 100. However, if there is a sensor tag 200 in which the setting of the identification information is incorrect, if there is a sensor tag 200 for which wireless communication with the reader/writer 100 is not scheduled, or the like, an unscheduled response signal from a sensor tag 200 is received.

In such a case, the reader/writer 100 may notify a user or a host device of information indicating that there is a sensor tag 200 other than the preset sensor tag 200.

L. Processing Procedure

Next, a processing procedure in the wireless sensor system 1 according to the present embodiment will be described.

Figure 15A:
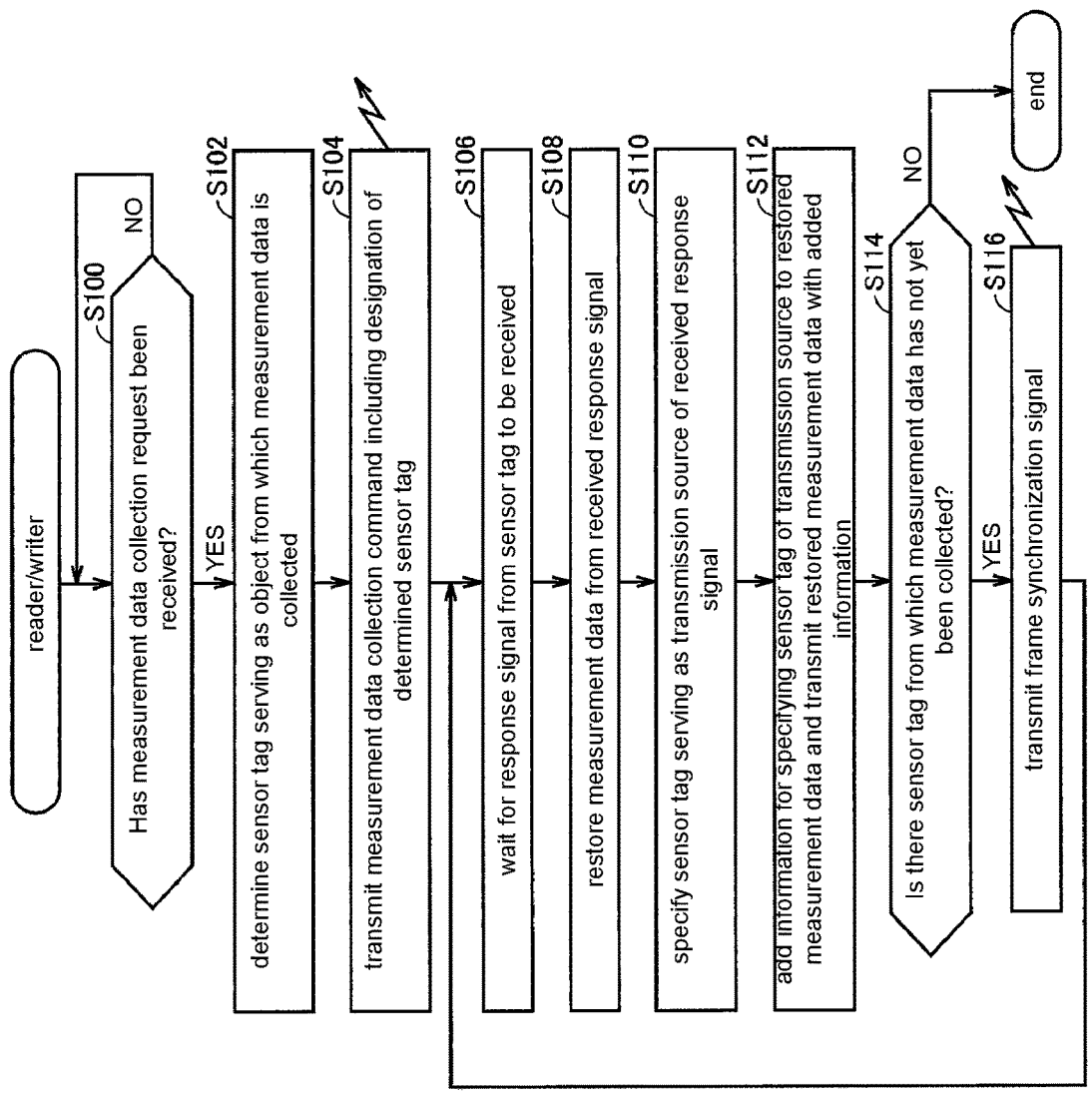
FIG. 15A and FIG. 15B are flowcharts illustrating a processing procedure in the wireless sensor system according to the present embodiment.
Figure 15B:
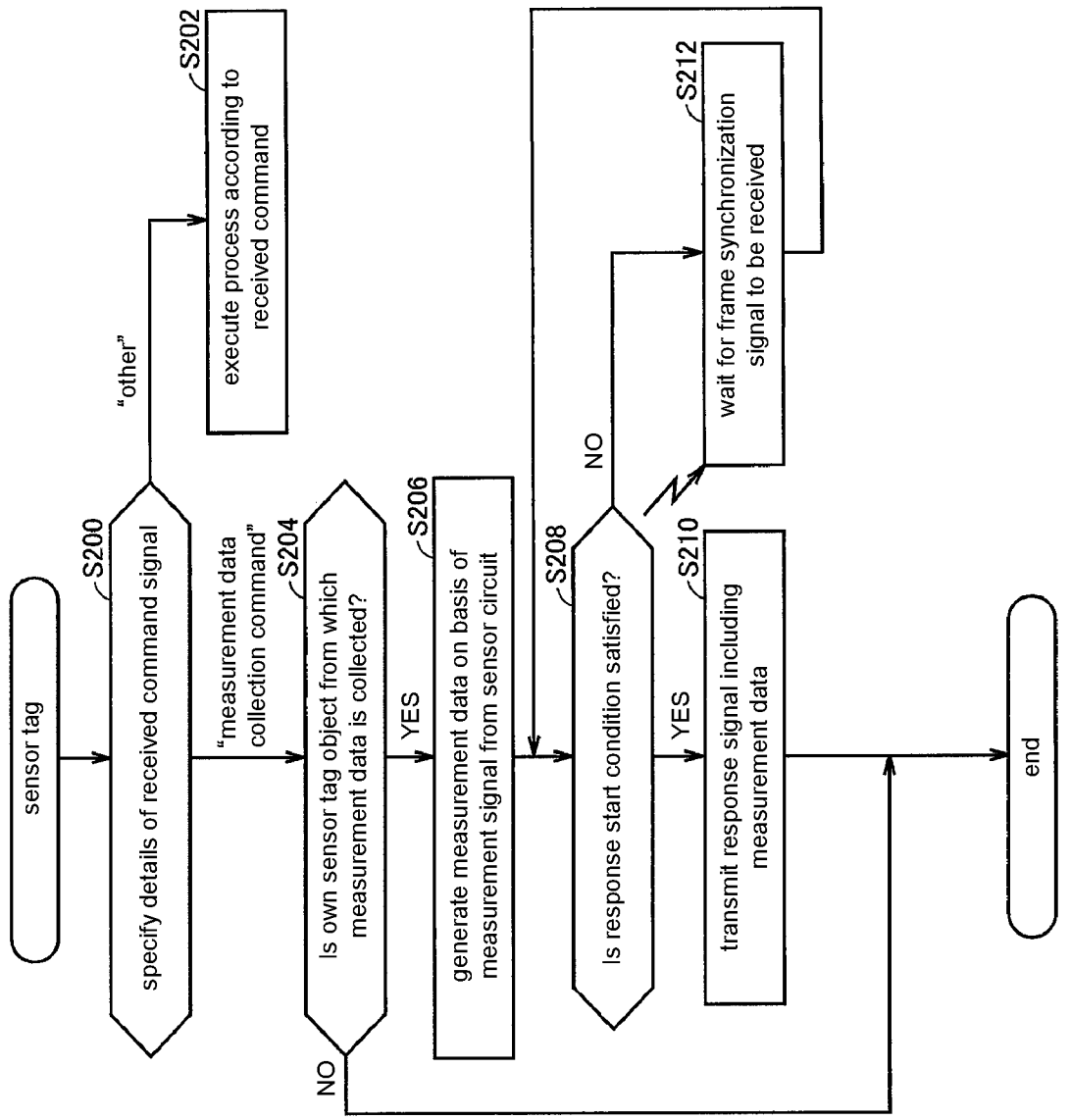

FIG. 15A and FIG. 15B are flowcharts illustrating a processing procedure in the wireless sensor system 1 according to the present embodiment. FIG. 15A illustrates a processing procedure in the reader/writer 100 and FIG. 15B illustrates a processing procedure in one sensor tag 200.

With reference to FIG. 15A, the reader/writer 100 determines whether or not a measurement data collection request has been received (step S100). The measurement data collection request may be given from a host device or the like or may be generated internally in accordance with a preset schedule. If the measurement data collection request has not been received (the case of NO in step S100), the processing of step S100 is iterated.

If the measurement data collection request has been received (the case of YES in step S100), the reader/writer 100 determines a sensor tag 200 serving as an object from which measurement data is collected by referring to the identification information list 107 on the basis of a received measurement data collection request (step S102), and transmits a measurement data collection command including designation of the determined sensor tag 200 (step S104).

Subsequently, the reader/writer 100 waits for a response signal to be received from the sensor tag 200 (step S106). When the response signal from the sensor tag 200 is received, the reader/writer 100 decodes the received response signal to restore the measurement data (step S108) and specifies the sensor tag 200 serving as the transmission source of the received response signal (step S110). Then, the reader/writer 100 adds information for specifying the sensor tag 200 of the transmission source to the restored measurement data and outputs the restored measurement data with the added information (step S112).

Subsequently, the reader/writer 100 determines whether or not there is a sensor tag 200 from which measurement data has not yet been collected among the objects from which the measurement data is collected (step S114). If the measurement data has been collected from all the sensor tags 200 determined to be the objects from which the measurement data is collected (NO in step S114), the process is completed On the other hand, if there is a sensor tag 200 from which measurement data has not yet been collected measurement data (YES in step S114), the reader/writer 100 transmits a frame synchronization signal (an additional command signal) (step S116). Then, the reader/writer 100 performs the processing from step S106. The processing of steps S106 to S116 is repeated until collection of measurement data is completed from all of the sensor tags 200 determined as objects.

Referring to FIG. 15B, when any command signal is received by the sensor tag 200, the processing from step S200 is performed using electric power included in the received command signal.

More specifically, the sensor tag 200 specifies details of the received command signal (step S200). If the received command signal is a command other than the measurement data collection command ("other" in step S200), the sensor tag 200 executes a process according to the received command (step S202).

On the other hand, if the received command signal is the measurement data collection command (the case of the "measurement data collection command" in step S200), the sensor tag 200 determines whether or not the sensor tag 200 is an object from which measurement data is collected on the basis of a group ID and/or an individual ID included in the received measurement data collection command (step S204). If the sensor tag 200 is not an object from which measurement data is collected (the case of NO in step S204), the process is terminated.

On the other hand, if the sensor tag 200 is an object from which measurement data is collected (the case of YES in step S204), the sensor tag 200 generates measurement data on the basis of a measurement signal from the sensor circuit 220 (step S206). Subsequently, the sensor tag 200 determines whether or not the response start condition is satisfied on the basis of the group ID and/or the individual ID included in the received measurement data collection command and its own individual ID (step S208).

If the response start condition is satisfied (the case of YES in step S208), the sensor tag 200 transmits a response signal including the measurement data generated in step S206 (step S210). Then, the process is terminated.

On the other hand, if the response start condition is not satisfied (the case of NO in step S208), the sensor tag 200 waits for the frame synchronization signal (the additional command signal) to be received from the reader/writer 100 (step S212). When the frame synchronization signal is received, the processing from step S208 is repeated. The processing of steps S208 and S212 is repeated until the transmission of the response signal is completed in each sensor tag 200.

M. Conclusion

In the wireless sensor system 1 according to the present embodiment, it is possible to easily measure a state of a machine, a facility, or the like to be controlled by arranging one or more of the sensor tags 200 including the sensor circuits at any position and commonly arranging the reader/writer 100 for collecting measurement data via wireless communication with these sensor tags 200.

In the wireless sensor system 1 according to the present embodiment, because a transmission timing of the response signal is automatically adjusted at the sensor tag 200 side so that a collision does not occur merely by transmitting a common command signal, it is also possible to minimize man-hours for management in a case in which the number of sensor tags 200 is increased or the like.

In the wireless sensor system 1 according to the present embodiment, a response property (a real-time property) which cannot be implemented by existing communication standards can be implemented.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A wireless sensor system comprising:
one or more sensor tags, wherein each of the one or more sensor tags configured to include a radio frequency tag; and
a transmitter communication device configured to wirelessly communicate with the one or more sensor tags,
wherein said each of the one or more sensor tags is configured to receive a measurement signal from one or more sensor circuits and stores identification information capable of being distinguished from that of other sensor tags,
wherein the transmitter communication device includes an antenna configured to transmit a command signal to said each of the one or more sensor tags, the command signal including designation information for designating a sensor tag from the one or more sensor tags serving as an object,
wherein said each of the one or more sensor tags generates measurement data on a basis of the measurement signal if the designation information included in the command signal received from the transmitter communication device matches the stored identification information of the sensor tag from the one or more sensor tags serving as the object,
wherein said each of the one or more sensor tags starts transmission of a response signal including the generated measurement data when a predetermined response start condition is satisfied,
wherein the identification information includes first identification information indicating a group to which said each of the one or more sensor tags belongs and second identification information for specifying said each of the one or more sensor tags,
wherein the predetermined response start condition in said each of the one or more sensor tags is defined by the second identification information that is set in said each of the one or more sensor tags and a number of receptions of a frame synchronization signal,
wherein the designation information includes information for designating the group serving as the object, and
wherein said each of the one or more sensor tags executes the generation of the measurement data and the transmission of the response signal if the first identification information that is stored matches the group designated in the designation information,
wherein said each of the one or more sensor tags starts the transmission of the response signal without causing a response delay when the generation of the measurement data is completed if the second identification information that is stored is a value indicating a head of a response of the response signal, and
wherein said each of the one or more sensor tags stalls the transmission of the response signal after the response delay collapses and waiting until a number of times that an additional command signal is transmitted from the transmitter communication device and the value indicated by the stored second identification information satisfy a predetermined relationship if the stored second identification information is not the value indicating the head of the response of the response signal.

2. The wireless sensor system according to claim 1, wherein the designation information includes first designation information for designating the group serving as the object and second designation information for individually designating the sensor tag serving as the object, and wherein said each of the one or more sensor tags executes the generation of the measurement data and the transmission of the response signal if the stored first identification information matches the first designation information for designating the group serving as the object and the stored second identification information matches the second designation information for individually designating the sensor tag serving as the object.

3. The wireless sensor system according to claim 1, wherein said each of the one or more sensor tags starts the transmission of the response signal after waiting for a time determined on the value indicated by the stored second identification information.

4. The wireless sensor system according to claim 1, wherein the response signal includes a plurality of measurement signals collected at different timings.

5. A transmitter communication device for wirelessly communicating with one or more sensor tags, each of the one or more sensor tags includes a radio frequency tag, said each of the one or more sensor tags being configured to receive a measurement signal from one or more sensor circuits and storing identification information capable of being distinguished from that of other sensor tags, the transmitter communication device comprising:

an antenna configured to transmit a command signal to said each of the one or more sensor tags, the command signal including designation information for designating a sensor tag from the one or more sensor tags serving as an object; and the antenna configured to receive a response signal from said each of the one or more sensor tags, the response signal including measurement data based on the measurement signal generated when the designation information included in the command signal matches the identification information stored in the sensor tag, the response signal being transmitted at a timing at which a response start condition set in said each of the one or more sensor tags is satisfied, wherein the identification information of said each of the one or more sensor tags includes first identification information indicating a group to which said each of the one or more sensor tags belongs and second identification information for specifying said each of the one or more sensor tags, wherein the response start condition in said each of the one or more sensor tags is defined by the second identification information that is set in said each of the one or more sensor tags and a number of receptions of a frame synchronization signal, wherein the designation information includes information for designating the group serving as the object, and wherein said each of the one or more sensor tags executes the generation of the measurement data and the transmission of the response signal if the first identification information that is stored matches the group designated in the designation information, wherein said each of the one or more sensor tags starts the transmission of the response signal without causing a response delay when the generation of the measurement data is completed if the second identification information that is stored is a value indicating a head of a response of the response signal, and wherein said each of the one or more sensor tags stalls the transmission of the response signal after the response delay collapses and waiting until a number of times that an additional command signal is transmitted from the transmitter communication device and the value indicated by the stored second identification information satisfy a predetermined relationship if the stored second identification information is not the value indicating the head of the response of the response signal.

6. One or more sensor tags, wherein each of the one or more sensor tags including a radio frequency tag, wherein said each of the one or more sensor tags is configured to receive a measurement signal from one or more sensor circuits and stores identification information capable of being distinguished from that of other sensor tags, wherein said each of the one or more sensor tags generates measurement data on a basis of the measurement signal if designation information for designating a sensor tag from the one or more sensor tags serving as an object included in a command signal matches the stored identification information when the command signal is received from a transmitter communication device configured to wirelessly communicate with said each of the one or more sensor tags, wherein said each of the one or more sensor tags starts transmission of a response signal including the generated measurement data when a predetermined response start condition is satisfied, and wherein the identification information includes first identification information indicating a group to which said each of the one or more sensor tags belongs and second identification information for specifying said each of the one or more sensor tags, wherein the predetermined response start condition in said each of the one or more sensor tags is defined by the second identification information that is set in said each of the one or more sensor tags and a number of receptions of a frame synchronization signal, wherein the designation information includes information for designating the group serving as the object, and wherein said each of the one or more sensor tags executes the generation of the measurement data and the transmission of the response signal if the first identification information that is stored matches the group designated in the designation information, wherein said each of the one or more sensor tags starts the transmission of the response signal without causing a response delay when the generation of the measurement data is completed if the second identification information that is stored is a value indicating a head of a response of the response signal, and wherein said each of the one or more sensor tags stalls the transmission of the response signal after the response delay collapses and waiting until a number of times that an additional command signal is transmitted from the transmitter communication device and the value indicated by the stored second identification information satisfy a predetermined relationship if the stored second identification information is not the value indicating the head of the response of the response signal.

7. A wireless communication method comprising:
including one or more sensor tags, wherein each of the one or more a sensor tags configured to include a radio frequency tag and a transmitter communication device configured to wirelessly communicate with said each of the one or more sensor tags, said each of the one or more sensor tags being configured to receive a measurement signal from one or more sensor circuits and storing identification information capable of being distinguished from that of other sensor tags transmitting, by the transmitter communication device, a command signal to said each of the one or more sensor tags, the command signal including designation information for designating a sensor tag from the one or more sensor tags serving as an object, generating, by said each of the one or more sensor tags, measurement data on a basis of the measurement signal if the designation information included in the command signal received from the transmitter communication device matches the stored identification information, and starting, by said each of the one or more sensor tags, transmission of a response signal including the generated measurement data when a predetermined response start condition is satisfied, wherein the identification information includes first identification information that is stored indicating a group to which said each of the one or more sensor tags belongs and second identification information that is stored for specifying said each of the one or more sensor tags, wherein the predetermined response start condition in said each of the one or more sensor tags is defined by the second identification information that is set in said each of the one or more sensor tags and a number of receptions of a frame synchronization signal, wherein the designation information includes information for designating the group serving as the object, and wherein said each of the one or more sensor tags executes the generation of the measurement data and the transmission of the response signal if the stored first identification information matches the group designated in the designation information, wherein said each of the one or more sensor tags starts the transmission of the response signal without causing a response delay when the generation of the measurement data is completed if the stored second identification information is a value indicating a head of a response of the response signal, and wherein said each of the one or more sensor tags stalls the transmission of the response signal after the response delay collapses and waiting until a number of times that an additional command signal is transmitted from the transmitter communication device and the value indicated by the stored second identification information satisfy a predetermined relationship if the stored second identification information is not the value indicating the head of the response of the response signal.

* * * * *